(12) United States Patent
Schmalz

(10) Patent No.: US 10,464,587 B2
(45) Date of Patent: Nov. 5, 2019

(54) UTILITY IMPLEMENT CONTROL HANDLE AND SNOW THROWER LIFTER

(71) Applicant: Briggs & Stratton Corporation, Wauwatosa, WI (US)

(72) Inventor: Jacob J. Schmalz, Milwaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 276 days.

(21) Appl. No.: 15/213,234

(22) Filed: Jul. 18, 2016

(65) Prior Publication Data
US 2017/0015342 A1    Jan. 19, 2017

Related U.S. Application Data

(60) Provisional application No. 62/193,071, filed on Jul. 16, 2015.

(51) Int. Cl.
| | | |
|---|---|---|
| *B62B 5/00* | (2006.01) | |
| *E01H 5/04* | (2006.01) | |
| *E01H 5/09* | (2006.01) | |
| *B62B 5/06* | (2006.01) | |

(52) U.S. Cl.
CPC ............. *B62B 5/0069* (2013.01); *B62B 5/06* (2013.01); *E01H 5/045* (2013.01); *E01H 5/098* (2013.01)

(58) Field of Classification Search
CPC ......... B62B 5/0069; B62B 5/06; E01H 5/045; E01H 5/098
See application file for complete search history.

(56) References Cited

U.S. PATENT DOCUMENTS

| | | | | | |
|---|---|---|---|---|---|
| 5,131,483 | A | * | 7/1992 | Parkes | B62D 11/04 180/333 |
| 5,644,903 | A | * | 7/1997 | Davis, Jr. | B62D 11/183 180/19.3 |
| 5,913,802 | A | * | 6/1999 | Mullet | A01D 34/6806 180/19.3 |
| 6,039,142 | A | * | 3/2000 | Eckstein | B60K 26/02 180/333 |
| 2004/0255493 | A1 | * | 12/2004 | Friberg | E01H 5/045 37/260 |
| 2007/0022635 | A1 | * | 2/2007 | Yamazaki | E01H 5/04 37/244 |
| 2008/0072556 | A1 | * | 3/2008 | Tegtmeier | A01D 34/66 56/7 |
| 2009/0064650 | A1 | * | 3/2009 | Eberle | A01D 34/81 56/14.7 |
| 2014/0173946 | A1 | * | 6/2014 | Gerrits | B62D 11/001 37/248 |

(Continued)

*Primary Examiner* — Jamie L McGowan
(74) *Attorney, Agent, or Firm* — Foley & Lardner LLP

(57) ABSTRACT

A utility implement may include a frame, traction members supported by the frame, a propulsion unit supported by the frame and operably coupled to the traction members, a handle bar coupled to the frame, a control handle extending from the handlebar and located to be gripped by an operator while the operator is maneuvering the utility implement and as the utility implement is being driven by the traction members and a control transmission associating the control handle to the propulsion unit such that manipulation of the control handle adjusts operation of the propulsion unit to adjust propulsion of the utility implement by the traction members.

16 Claims, 25 Drawing Sheets

(56) References Cited

U.S. PATENT DOCUMENTS

2014/0262560 A1* 9/2014 Dwyer .................. A01D 34/82
                                            180/6.48
2014/0331634 A1* 11/2014 Korthals .............. A01D 34/005
                                            56/320.2

* cited by examiner

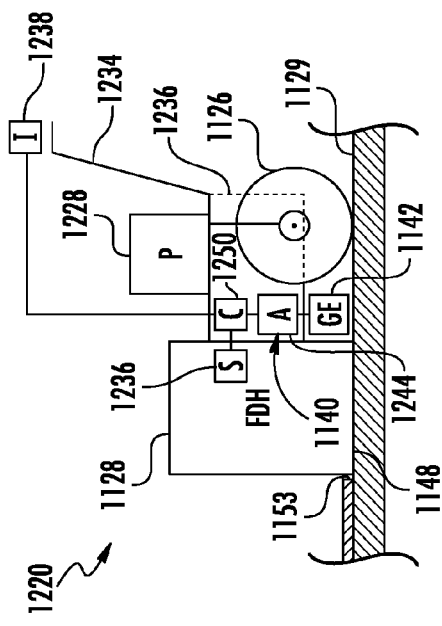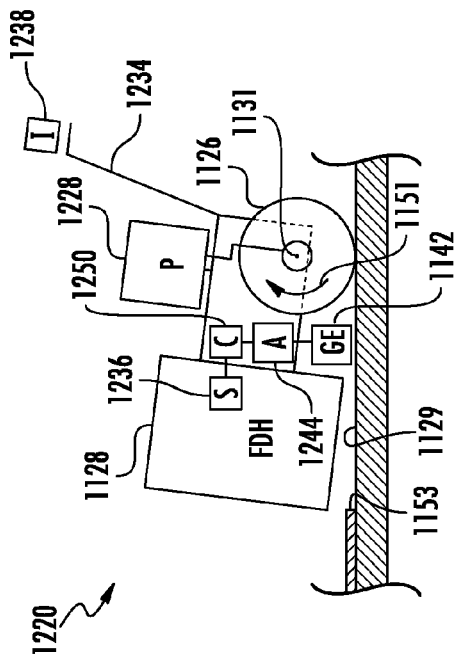
FIG. 27
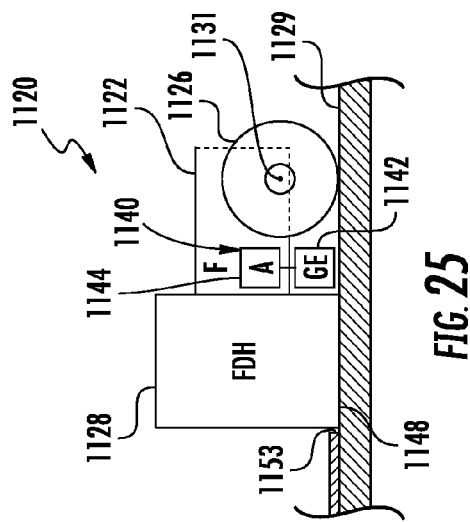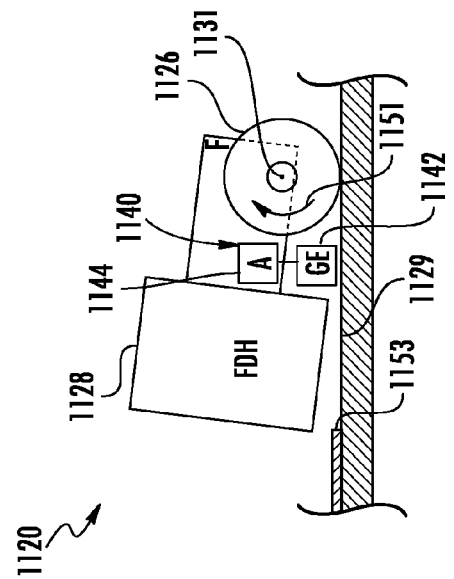
FIG. 25
FIG. 28
FIG. 26

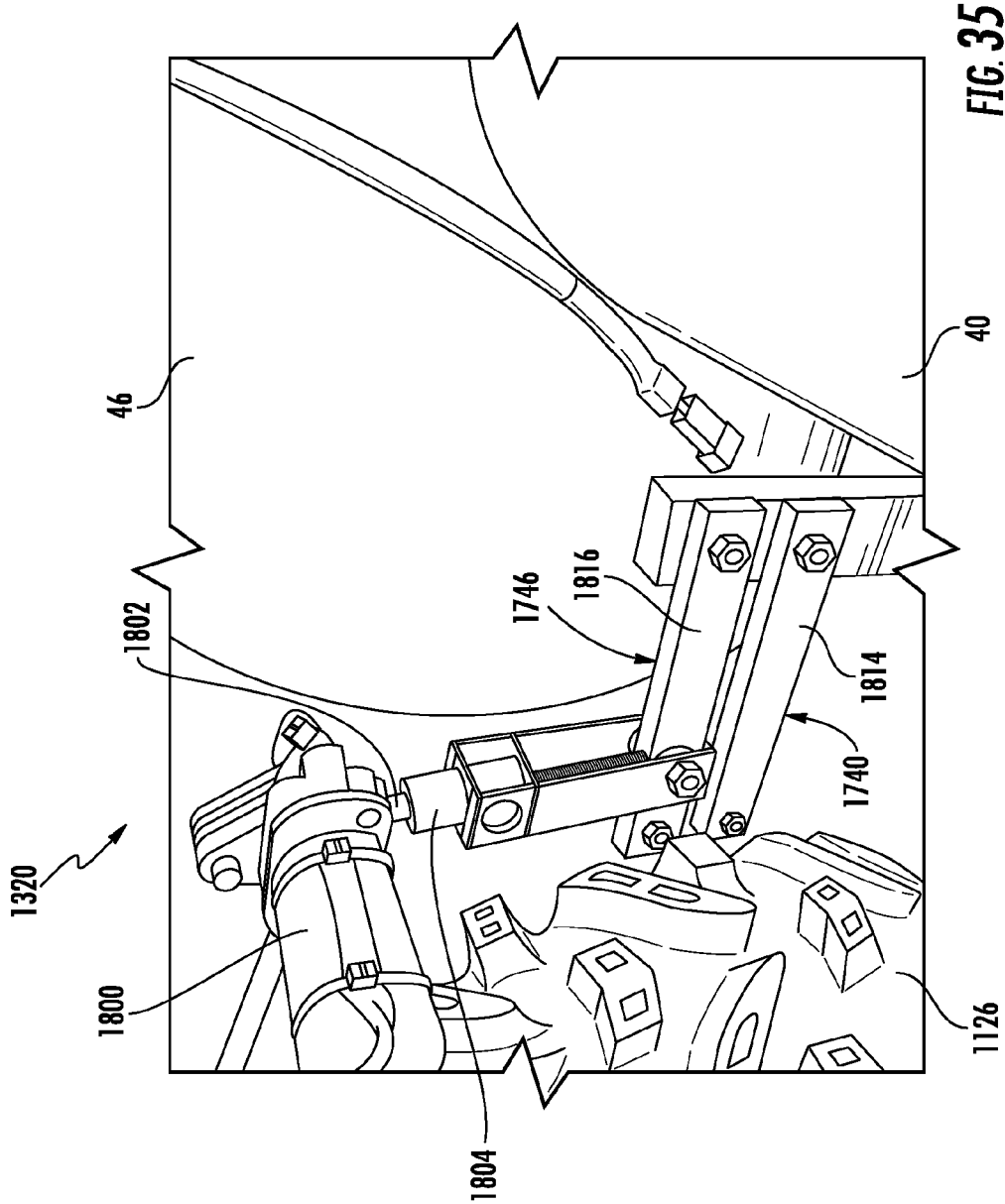

UTILITY IMPLEMENT CONTROL HANDLE AND SNOW THROWER LIFTER

CROSS-REFERENCE TO RELATED PATENT APPLICATIONS

The present application is a US non-provisional application claiming priority under 35 USC 119 from co-pending U.S. Provisional Patent Application 62/193,071 filed on Jul. 16, 2015 by Jacob J. Schmalz and entitled UTILITY IMPLEMENT CONTROL HANDLE AND SNOW THROWER LIFTER, the full disclosure of which is hereby incorporated by reference.

BACKGROUND

Utility implements may be used for a variety of purposes. One example of a utility implement is a snow thrower. Control of utility implements is often not intuitive and difficult.

BRIEF DESCRIPTION OF THE DRAWINGS

FIG. 25 is a side view schematically illustrating another example utility implement in a first position.

FIG. 26 is a side view schematically illustrating the utility implement of FIG. 25 and a second position.

FIG. 27 is a side view schematically illustrating another example utility implement in a first position.

FIG. 28 is a side view schematically illustrating the utility implement of FIG. 27 in a second position.

FIG. 35 is a side perspective view of the example lifter of FIG. 32.

DETAILED DESCRIPTION OF EXAMPLES

Figure 1:
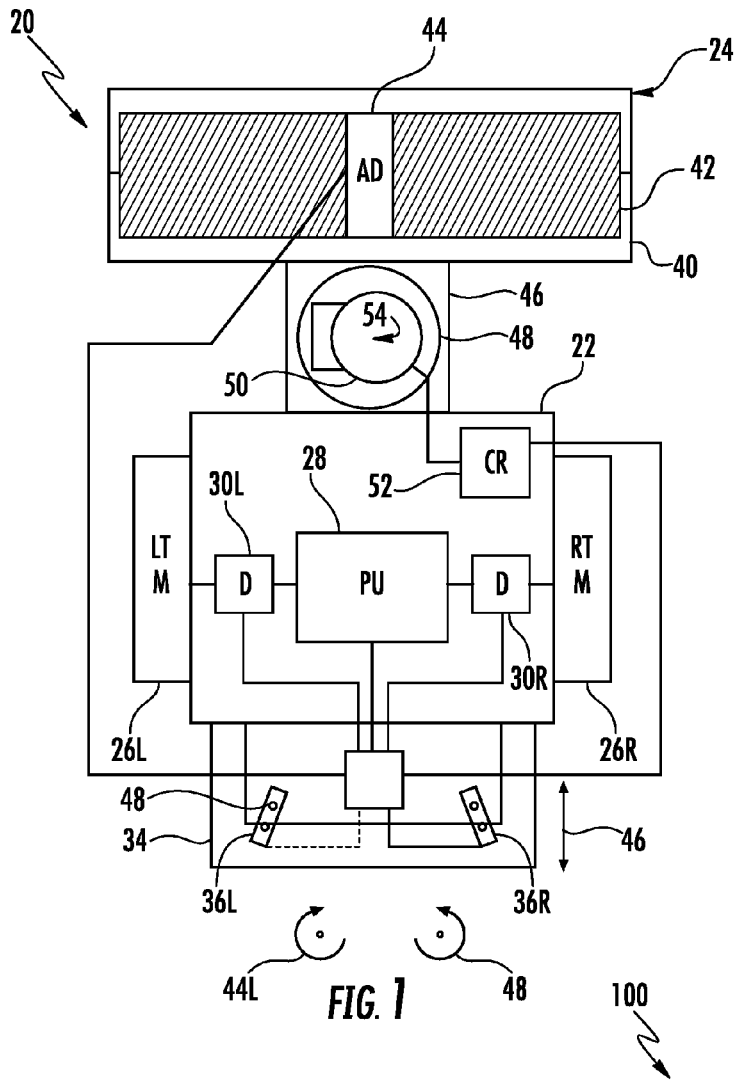
FIG. 1 is a schematic diagram of an example utility implement, shown as a snow thrower.

FIG. 1 schematically illustrates an example utility implement, shown as snow thrower 20. As will be described hereafter, snow thrower 20 comprises a manually actuatable control handle and an associated control transmission that provides intuitive manual control of one or more operational parameters of snow thrower 20 while allowing the operator to maintain his or her grip of snow thrower 20 during maneuvering of snow thrower 20. In other words, snow thrower 20 allows an operator to adjust operational parameters of snow thrower 20 without the operator having to temporarily release his or her grip of a handler handlebar of snow thrower 20. Although illustrated as being utilized in a utility implement comprising a snow thrower, the actuatable control handle an associated control transmission described hereafter is equally applicable to other utility implements in which forward propulsion of the implement and other operation modes are to be controlled. Examples of such utility implements which may include the control handle and control transmission as described hereafter, include, but are not limited to, other types of snow throwers, walk behind mowers, wide area walk mowers, sweepers, stand on zero turn radius mowers, tillers, other outdoor power equipment and the like.

Snow thrower 20 comprises frame 22, snow discharger 24; traction members 26L, 26R (collectively referred to traction members 26), propulsion unit 28, left traction member deactivator or disengager 30L and right traction member deactivator or disengager 30R (collectively referred to as traction member disengagers 30), handlebar 34, left control handle 36L and right control handle 36R (collectively referred to as control handles 36) and control transmission 38. Frame 22 comprises a structure serving as platform, housing and enclosure for snow thrower 20. Frame 22 supports the remaining components of snow thrower 20.

Snow discharger 24 comprises a mechanism to break up accumulated snow and to discharge, impel or propel such snow. In the example illustrated, snow discharger 24 comprises a two-stage snow discharger comprising both an auger to break up snow and an impeller to impel or throw snow. In other implementations, snow discharger 24 may comprise a single stage snow thrower in which a single rotatably driven member breaks up snow and impeller throws snow. Snow discharger 24 comprises auger housing 40, auger 42, auger drive 44, impeller housing 46, impeller 48, chute 50 and chute rotator 52. Auger housing 40 extends about auger 42 and rotationally supports auger 42. Auger 42 comprises a series of helical vanes configured to cut into snow and move snow towards an inlet of impeller housing 46. For purposes of this disclosure, the phrase "configured to" denotes an actual state of configuration that fundamentally ties the stated function/use to the physical characteristics of the feature proceeding the phrase "configured to".

Auger drive 44 comprises a device by which auger 42 is rotationally driven. In one implementation, auger drive 44 comprises a transmission operably coupled between auger 42 and propulsion unit 28 so as to receive power from propulsion unit 28. In another implementation, auger drive 44 may comprise a separate motor or other power source operably coupled to auger 42 for driving auger 42.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Impeller housing 46 extends rearwardly from auger housing 42 and receives snow gathered by auger 42. Impeller 48 comprises a rotationally driven member which impels snow upwardly through chute 50. In the example illustrated, impeller 48 is rotationally driven utilizing power or torque received from propulsion unit 28. In other implementations, impeller 48 may be powered by a separate power source.

Chute 50 extends from impeller housing 46 and directs snow impelled by impeller 48. In the example illustrated, chute 50 is rotatable about axis 54 such that snow may be directed to either side or at various angles with respect to snow thrower 20. Chute rotator 52 comprises a mechanism by which chute 50 is rotated about axis 54. In one implementation, chute rotator 52 comprises a transmission utilizing torque from propulsion unit 28 to selectively rotationally move chute 50. In yet another implementation, chute rotator 52 comprises an independent power source, such as a motor or electric solenoid operably coupled to chute 50 by a transmission such that chute 50 may be selectively rotated about axis 54 to different angular positions.

Traction members 26 comprise member movably supported by frame 22 in engagement with the grounder underlying terrain. Traction members 26 are operably coupled to propulsion unit 28 so as to be driven and powered by propulsion unit 28 to drive or propel snow thrower 20. In one implementation, traction members 26 comprise wheels. In yet another implementation, traction members 26 comprise webbed tracks wrapping about driving wheels or driving sprockets. In the example illustrated, traction members 26 are independently drivable such that one may be driven while the other is not driven, facilitating powered turning through the use of traction member disengagers 30.

Propulsion unit 28 comprises a device to supply torque or power to traction members 26. Propulsion unit 28 comprises a power source, such as an internal combustion engine or an electric motor, which is operably coupled to traction members 26 by a transmission. The transmission may comprise one or more gear trains, a belt and pulley arrangement, the chain and sprocket arrangement or combinations thereof. The transmission of power is controllable through the use of one or more clutches, movable and actuatable idler gears, variators or similar mechanisms.

Traction member disengagers 30 comprise mechanisms to selectively and independently disengage propulsion unit 28 from the individual traction members 26. Traction member disengager 30L, when actuated, disengages left traction member 26L from propulsion unit 28 independent of the state of right traction member 26R. Likewise, right traction member disengager 30R, when actuated, disengages right traction member 26R independent of the state of left traction member 26L. In one implementation, traction member disengagers 30 comprise clutches. In other implementations, traction member disengages 30 may comprise other mechanisms which operably interact with the transmission between the power source of propulsion unit 28 and traction members 26 to interrupt the transmission of power to traction members 26. In some implementations, traction member disengages 30 may be omitted, wherein traction members 26 rotate in unison.

Handlebar 34 comprises a curved steering bar or rod extending from frame 22. In the example illustrated, handlebar 34 projects upwardly and rearwardly from frame 22, providing a horizontal bar or rod at a height from and between the height of an operator's waist to the height of an operator's shoulders. Handlebar 34 provides gripping surfaces by which an operator may push, pull or maneuver snow thrower 20 while snow thrower 20 is not under power. Although handlebar 34 is illustrated as comprising a U-shaped member, in other implementations, handlebar 34 comprises two opposing L-shaped members.

Control handles 36 comprise handles with gripping surfaces projecting from handlebar 34 which are located so as to be gripped by an operator while the operator is maneuvering the snow thrower 20 and as snow thrower 20 is being driven by traction members 26, wherein control handles 36 are actuatable to adjust at least one operational parameter of snow thrower 20 while the operator is allowed to continue to maintain his or her grip upon such control handles 36. In the example illustrated, each of control handles 36 are configured in the form of joysticks or rods, providing cylindrical or substantially cylindrical structures sized such that an operator may wrap his or her hands about control handles 36 so as to grip handles 36 between a person's thumb and fingers. As a result, a person may utilize both of his or her hands to control the one of more parameters of snow thrower 20 while snow thrower 20 is being propelled forwardly or rearwardly by traction members 26. The maneuvering of snow thrower 20 does not need to be interrupted to change the one or more operational parameters. Moreover, the control of snow thrower 20 is continuous and intuitive.

In another implementation, handlebar 34 may comprise two independently movable L-shaped members, wherein control handles 36, in lieu of comprising joysticks projecting from handlebar 34, alternatively comprise inwardly the extending and independently movable ends of handlebar 34 itself. In such an implementation, the two independently movable L-shaped members pivot relative to frame 22 and relative to one another about a transverse horizontal axis, wherein such movement results in different operational parameters for snow thrower 20. For example, in one implementation, forward movement of control handle 36L and the left L-shaped portion of handlebar 34 results in forward movement of the left traction member 426L and rearward movement control handle 36L and the left L-shaped portion of handlebar 34 results in rearward movement or reverse rotation of the left traction member 26L. Speed is adjusted based upon the angular extent at which the control handle 36L is rotated forwardly or rearwardly with respect to a neutral position. Forward rotation or rear rotation of control handle 36R and the right L-shaped portion of handlebar 34 similarly adjusts transmission of power from propulsion unit 28 to the right traction member 26R.

Control transmission 38 comprises one or more devices by which actuation of control handles 34 is communicated to operational components of snow thrower 24 to adjust operational parameters of snow thrower 24. In one implementation, control transmission 38 comprises a series of one or more mechanical linkages, cables (such as Bowden cables) and the like by which actual movement of control handles 36, such as linear movement, pivoting or twisting, is transmitted to operational components of snow thrower 24 to adjust operational parameters of snow thrower 24. For example, in one implementation, handles 36L and 36R are pivotable or rotatable in directions as indicated by arrows 44L and 44R, respectively, wherein such motion is transmitted by linkages and/or cables so as to proportionally or disproportionally move a lever associated with an operational component of snow thrower 20 so as to adjust an operational parameter of snow thrower 20. In yet another implementation, handles 36 are linearly movable in a forward/reverse direction along a fore-aft axis 46, wherein such linear motion is transmitted by linkages and/or cables to proportionally or disproportionally move a lever associated with an operational component of snow thrower 22 is to adjust an operational parameter of snow thrower 20. In yet another implementation, handles 36 are twistable about their own axes, wherein such motion or torque is transmitted by linkages and/or cables to proportionally or disproportionally move a lever associated with an operational component of snow thrower 22 is to adjust an operational parameter of snow thrower 20.

In one implementation, handles 36 are each configured to be moved in different fashions to adjust two different operational parameters. For example, in one implementation, handles 36 are rotatable to adjust a forward/reverse and speed operational parameter of snow thrower 20 through the adjustment of propulsion unit 28 while handles 36 are also linearly movable to adjust a left/right driving state of traction members 26 through the adjustment of disengagers 30.

In one implementation, control transmission 38 additionally or alternatively comprises electronics. Such electronics utilize one or more sensors which sense movement of control handles 36, wherein the electronics utilize the signals from such sensors to generate control signals causing one or more actuators to adjust operational components of snow thrower 24 to adjust operational parameters of snow thrower 24. For example, in one implementation, pivoting or rotation of handles 36 in directions as indicated by arrows 44L and/or 44R is sensed by a potentiometer, wherein a controller, such as an application-specific integrated circuit or a processor, generates control signals based upon signals from the potentiometer to cause an actuator, such as electric solenoid, stepper motor or the like, to adjust an operational component of snow thrower 22 so as to adjust an operational parameter of snow thrower 20.

In yet another implementation, control transmission 38 may additionally or alternatively comprise one or more manually actuatable inputs carried by control handles 36. Such manually actuatable inputs may comprise pushbuttons, a touchpad, slider bars, rocker switches and the like, wherein actuation of such inputs results in the generation of control signals causing an actuator such as electric solenoid, stepper motor or the like to adjust an operational component of snow thrower 22 and so as to adjust an operational parameter of snow thrower 20. For example, in one implementation, while gripping control handle 36R, an operator may depress, tap, squeeze and/or slide a manual input located along the circumferential surface of control handle 36R or located on an axial end of control handle 36R to adjust in operational parameter of snow thrower 20.

In yet another implementation, control transmission 38 may additionally or alternatively comprise a hydraulic or pneumatic pump in one or more hydraulic or pneumatic directional control valves, wherein actuation of control handles 36 adjusts such valves and results in hydraulic or pneumatic fluid being redirected to adjust an operational component so as to adjust an operational parameter of snow thrower 20. In one implementation, movement or motion imparted to control handles 36 is transmitted directly to the valve to open or closed the valve. In another implementation, movement of control handles 36 is sensed, wherein control signals generated based upon the sense movement cause an actuator to adjust the state of the directional control valve.

In one implementation, each of control handles 36L and 36R are independently actuatable to control different operational components and different operational parameters of snow thrower 20. In yet another implementation, control handles 36 are linked or mechanically coupled to one another such that movement of either of handles 36 changes an operational parameter of snow thrower 20 in the same fashion. For example, the rotation of handle 36L in a clockwise direction as indicated by arrow 44L automatically results in rotation of handle 36R in a counterclockwise direction as indicated by arrow 44R, wherein such rotation of handles 36 results in adjustment of an operational parameter. In another implementation, handles 36 are mechanically coupled to one another or linked to another to change an operational parameter in a binary fashion. For example, linear movement of handle 36L in a forward direction along axis 46 automatically results in rearward movement of handle 36R along axis 46 to adjust left traction member disengager 30L, whereas linear movement of handle 36R in a forward direction along axis 46 automatically results in rearward movement of handle 36L along axis 46 to adjust right traction member disengager 30R.

In the example illustrated, snow thrower 20 comprises multiple operational components and operational parameters which are adjustable through interaction with control handles 36. In the example illustrated, rotation of handles 36 as indicated by arrows 44L and 44R adjusts operation of propulsion unit 28 to adjust/rearward movement of snow thrower 20 as well as to adjust the speed at which propulsion unit 28 drives traction members 26 and snow thrower 20 in either the forward direction or the reverse direction. Linear movement of handles 36 along axis selectively actuates traction member disengagers 30 to selectively disengage and engage the left traction member 26L or the right traction member 26R to adjust to slippage or to facilitate powered turning of snow thrower 20. Actuation of manual inputs 48 carried by control handles 36 adjusts the operation of auger drive 44 to adjust an on/off state of auger 42 or to adjust the speed at which auger 42 is driven. Actuation of manual inputs 48 carried by control handles 36 adjusts the operation of chute rotator 52 to cause an actuator (electric solenoid, stepper motor of the like) to rotate chute 50 into the desired angular position for throwing snow. In one implementation, actuation inputs 48 carried by handles 36 further adjust the height of auger housing 40 and auger 42, wherein actuation of the manual inputs 48 results in the generation of control signals causing an actuator to selectively raise or lower auger housing 40.

Figure 2:
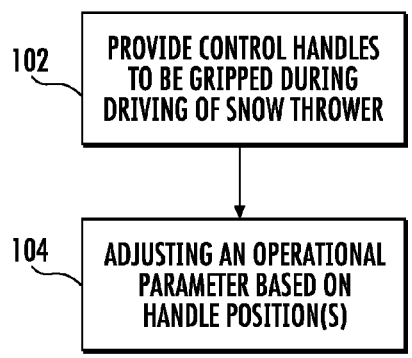
FIG. 2 is a flow diagram of an example method for controlling a utility implement, such as a snow thrower.

FIG. 2 is a flow diagram illustrating an example method 100 that may be carried out by snow thrower 20. As indicated by block 102, control handles, which are to be gripped during driving of a snow thrower, are provided. As indicated by block 104, one or more operational parameters of the snow thrower are adjusted in response to movement of the control handles to different positions. As noted above, such movement may be linear movement, in the fore-aft direction or in a transverse direction, may be rotational movement about fore-aft axes or may be rotational movement about the axes of the control handles themselves. In one implementation, adjustment of the one or more operational parameters may be based upon the repositioning of an individual control handle independent of the other control handle. In yet another implementation, adjustment of one or more operational parameters is based upon a combination of movement of both control handles 36, both of which are movable independent of one another. For example, repositioning of control handle 36L to a first position may produce different adjustments to one or more operational parameters snow thrower 20 depending upon the corresponding repositioning of control handle 36R. yet another implementation, the two control handles may be linked for corresponding movement.

Figure 3:
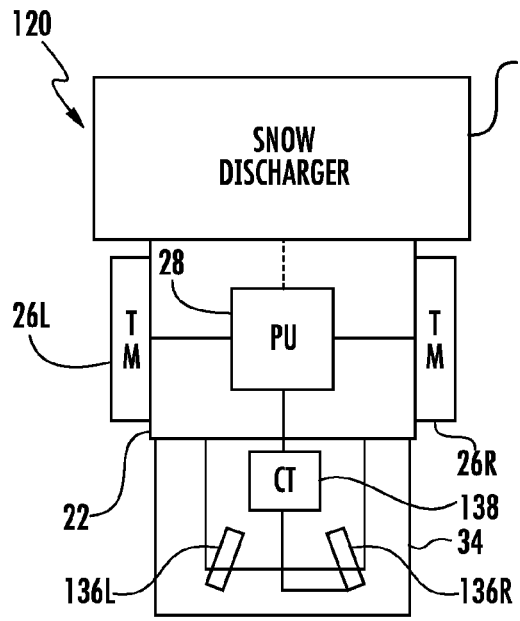
FIG. 3 is a schematic diagram of another example utility implement, shown as a snow thrower.

FIG. 3 schematically illustrates snow thrower number 120, an example implementation of snow thrower 20. Snow thrower 120 comprises frame 22, snow discharger 24, traction members 26, propulsion unit 28 and handlebar 34, each of which is described above with respect to system 20. As indicated by broken lines, in one implementation, propulsion unit 28 additionally drives the snow interacting components of snow discharger 24 such as the auger and/or impeller (depending upon whether snow discharger 24 is a single stage or a two-stage).

Snow thrower 20 additionally comprises control handles 136L, 136R and control transmission 138. In the example illustrated, control handle 136L comprises a stationary fixed control handle projecting from handlebar 34. At the same time, control handle 136R is movable or actuatable. Adjustment of one or more operational parameters of snow thrower 120 are facilitated through actuation of control handle 136R.

Control transmission 138 facilitates communication between control handle 136R and the transmission of propulsion unit 28. In one implementation, control transmission 138 facilitates communication between control handle 136R and the transmission of propulsion unit 28 such that rotation of handle 136R about a generally longitudinal or fore-aft extending axis adjusts operation of the transmission of propulsion unit 28 to adjust/rearward movement of snow thrower 120 as well as to adjust the speed at which proponent unit 28 drives traction members 26 and snow thrower 120 in either the forward or the reverse direction. In another implementation, actuation of handle 136R alternatively adjusts just the speed or just the forward/reverse driving state of the transmission of propulsion unit 28. In one implementation, control transmission 138 mechanically links control handle 136R to the transmission of propulsion unit 28 such that movement or motion of handle 136R (the movement of the entire handle 136R relative to handlebar 34) is passed along or transmitted to a control lever associated with the power source and/or the transmission of propulsion unit 28 to adjust the speed and/or/reverse driving state of propulsion unit 28. In another implementation, control transmission 138 utilizes electronics such as through the use of a sensor, controller and actuator to actuate a control lever associated with the transmission of propulsion unit 28 based upon the positioning of handle 136R to adjust the speed and/or forward/reverse state of propulsion unit 28. In yet another implementation, control transmission 138 utilizes hydraulics/pneumatics such as through use of a pump, and directional control valves to actuate a control lever associated with the transmission of propulsion unit 28 based upon the positioning of handle 136R to adjust the speed and/or reverse state of propulsion unit 28.

Figure 4:
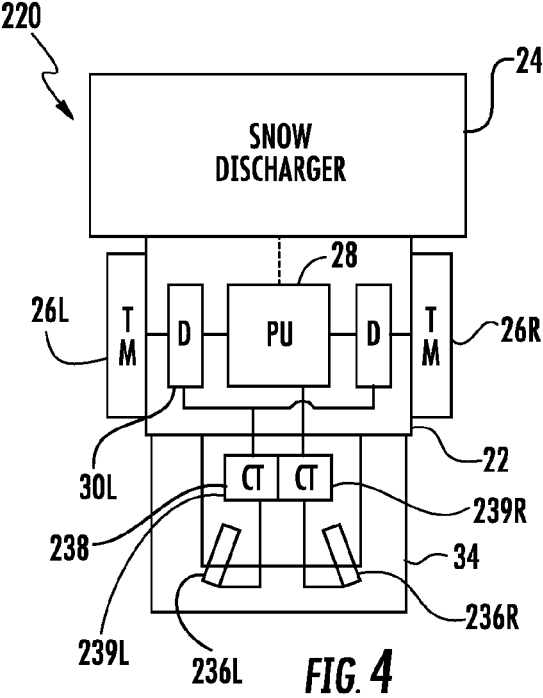
FIG. 4 is a schematic diagram of another example utility implement, shown as a snow thrower.

FIG. 4 schematically illustrates snow thrower 220, another example implementation of snow thrower 20. Snow thrower 220 comprises frame 22, snow discharger 24, traction members 26, propulsion unit 28, traction member disengagers 30 and handlebar 34, each of which is described above with respect to system 20. As indicated by broken lines, in one implementation, propulsion unit 28 additionally drives the snow interacting components of snow discharger 24 such as the auger and/or impeller (depending upon whether snow discharger 24 is a single stage or a two-stage).

Snow thrower 220 additionally comprises control handles 236L, 236R (collectively referred to as control handles 236) and control transmission 238. Control handles 236 are similar to control handles 36 in that control handles 236 extend or project from handlebar 34. In the example illustrated, each of control handles 236 are movable or repositionable. In the example illustrated, each of control handles 236 communicates with an operational component of snow thrower 20 through control transmission 238. In the example illustrated, control handles 236 adjust different operational parameters of snow thrower 20. For example, manipulation or movement of control handle 236L adjusts a first operational parameter of snow thrower 20 while independent manipulation or movement of control handle 236R adjusts a different operational parameter of snow thrower 20. In the example illustrated, movement or adjustment of control handle 236L actuates either of traction member disengagers 30L, 30R to selectively disengage the transmission of power to a selected one of traction members 26 by propulsion unit 28. As the same time, movement or adjustment of control handle 236R adjusts operation of the transmission of propulsion unit 28 to change the direction in which snow thrower 220 is being driven (forward or reverse) by propulsion unit 28 and/or to change the speed at which propulsion unit 28 is driving traction members 26 and snow thrower 220 in either the forward or the reverse direction.

Control transmission 238 operationally connects the movement of control handles 236 to the adjustment of the transmission of propulsion unit 28 and traction member disengager 30. In the example illustrated, control transmission 238 comprises two separate or independent control transmission portions, a first portion 239L for control handle 236L and a second portion 239R for control handle 236R (collectively referred to as portions 239). Portion 239L facilitates communication between control handle 236L and each of traction member disengagers 30. Portion 239R facilitates communication between control handle 236R and the transmission of propulsion unit 28. In one implementation, portions 239 comprise mechanical coupling arrangements such as provided by linkages, cables, rods, gears, belt and pulley or chain and sprocket arrangements, whereby motion of the associated handle 236 is transmitted to a lever or other mechanical input associated with either propulsion unit 28 or disengagers 30. In one implementation, control handles 236 are each actuatable in a similar fashion to adjust different operational parameters. For example, control handles 236 may be rotatable about a longitudinal axis to adjust their respective operational components such as propulsion unit 28 and disengagers 30. In yet another implementation, control handles 236 are each actuatable in different fashions to adjust different operational parameters. For example, in one implementation, one of control handles 236 is pivotable about a longitudinal axis to adjust an operational parameter while the other of control handles 236 is linearly movable along a longitudinal axis to adjust its associated operational parameter. In other implementations, such communication may be facilitated by electronics, hydraulics or pneumatics as described above.

Figure 5:
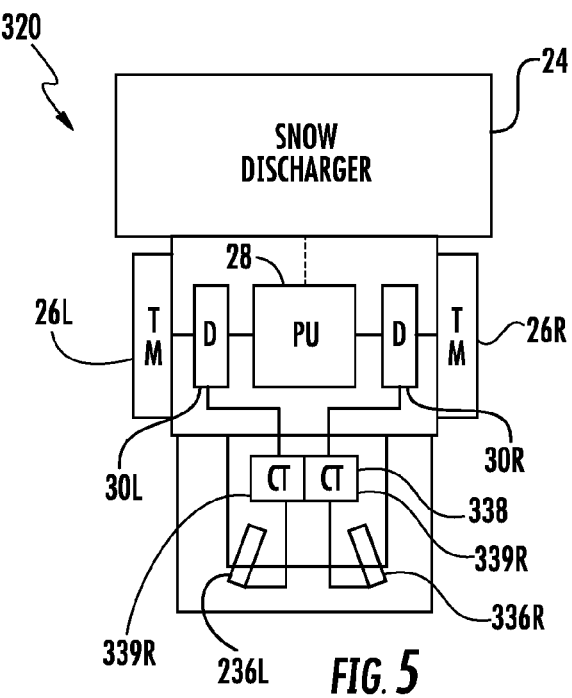
FIG. 5 is a schematic diagram of another example utility implement, shown as a snow thrower.

FIG. 5 schematically illustrates snow thrower 320, another example implementation of snow thrower 20. Snow thrower 320 comprises frame 22, snow discharger 24, traction members 26, propulsion unit 28, traction member disengagers 30 and handlebar 34, each of which is described above with respect to system 20. As indicated by broken lines, in one implementation, propulsion unit 28 additionally drives the snow interacting components of snow discharger 24 such as the auger and/or impeller (depending upon whether snow discharger 24 is a single stage or a two-stage). In one implementation, traction member disengagers 30 facilitate continuous adjustment of the amount of power or torque that is transmitted to the respective traction member 26. For example, disengager 30 is actuatable between a first state in which zero torque is transmitted, a second state in which the first non-zero amount of torque is transmitted and a third state in which a second amount of torque, greater than the first amount of torque, is transmitted from propulsion unit 28 to the respective traction member 26.

Snow thrower 320 additionally comprises control handles 336L, 336R (collectively referred to as control handles 336) and control transmission 338. Control handles 336 are similar to control handles 36 in that control handles 336 extend or project from handlebar 34. In the example illustrated, each of control handles 336 are movable or repositionable. In the example illustrated, control handle 336L communicates with and adjusts operation of traction member disengager 30L while control handle 336R communicates with and adjusts operation of traction member disengager 30R.

Control transmission 338 operationally connects the movement of control handles 336 to the adjustment of traction member disengagers 30. In the example illustrated, control transmission 338 comprises two separate or independent control transmission portions, a first portion 339L for control handle 336L and a second portion 339R for control handle 336R (collectively referred to as portions 339). Portion 339L facilitates communication between control handle 236L and 30L traction member disengager 30L. Portion 339R facilitates communication between control handle 236R and traction member disengager 30R. In one implementation, portions 339 comprise mechanical coupling arrangements such as provided by linkages, cables, rods, gears, belt and pulley or chain and sprocket arrangements, whereby motion of the associated handle 336 is directly transmitted to a lever or other mechanical input associated with the associated disengager 30. In one implementation, control handles 336 are each actuatable in a similar fashion to adjust different operational parameters. For example, control handles 336 may be rotatable about a longitudinal axis to adjust disengagers 30. In yet another implementation, control handles 336 are each actuatable in different fashions to adjust disengager 30. In other implementations, such communication may be facilitated by electronics, hydraulics or pneumatics as described above.

Figure 6:
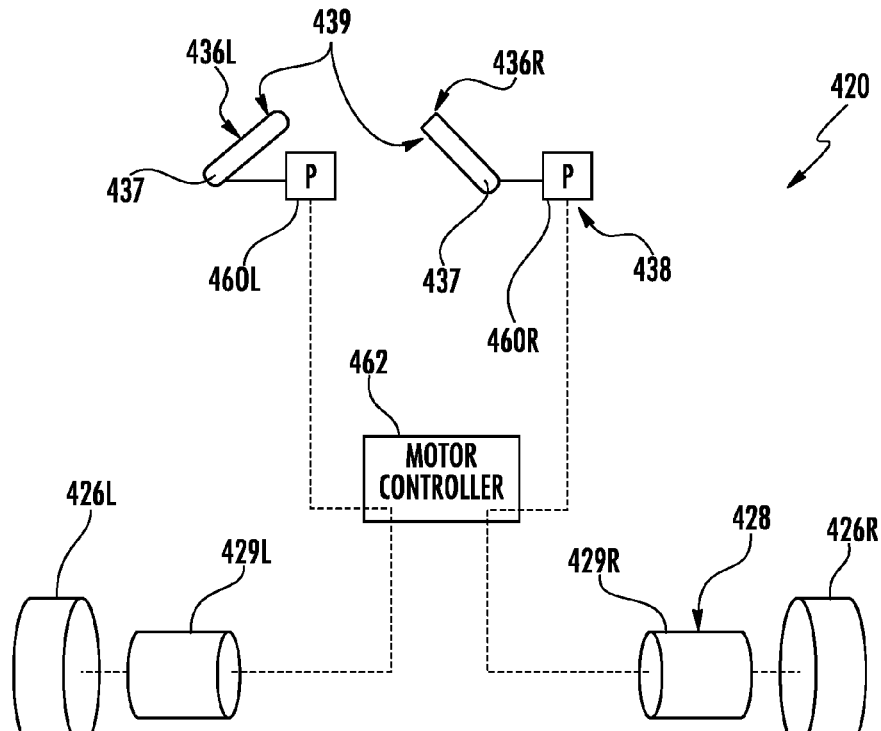
FIG. 6 is a schematic diagram of another example utility implement.

FIG. 6 schematically illustrates snow thrower 420, another implementation of snow thrower 20. Snow thrower 420 comprises frame 22, snow discharger 24 and handlebar 34 as described above. Snow thrower 420 additionally comprises traction members 426L, 426R (collectively referred to as traction member 0426), propulsion unit 428, control handles 436L, 436R (collectively referred to as control handles 436) and control transmission 438. Traction members 426 comprise wheels. In other implementations, traction members 426 may comprise driven belts, webs or tracks.

Propulsion unit 428 comprises an electric propulsion unit. In the illustrated example, propulsion 428 comprises a left electric motor 429L to drive traction member 426L and a right electric motor 429R to drive traction member 426R. In the illustrated, each of motors 429 are independently operable to drive traction members 426 at different speeds.

Control handles 436 are similar to control handles 36 in that control handles 436 project or extend from handlebar 34. In the example illustrated, control handles 436 are rotatable about axes 437 as indicated by arrows 439. Such actuation results in adjustment of the operation of the speed and/or direction at which traction members 426 are driven by motors 429. In other implementations, control handles 436 are alternatively configured to be moved or repositioned in other fashions, such as by being linearly moved in either a longitudinal direction or a transverse direction.

In another implementation, handlebar 34 may comprise two independently movable L-shaped members, wherein control handles 436, in lieu of comprising joysticks projecting from handlebar 34, alternatively comprise inwardly the extending and independently movable ends of handlebar 34 itself. In such an implementation, the two independently movable L-shaped members pivot relative to frame 22 and relative to one another about a transverse horizontal axis, wherein such movement results in different operational parameters for snow thrower 420. For example, forward movement control handle 336L and the left L-shaped portion of handlebar 34 results in forward movement of the left traction member 426L and rearward movement control handle 436L and the left L-shaped portion of handlebar 34 results in rearward movement or reverse rotation of the left traction member 426L. Speed is adjusted based upon the angular extent at which the control handle 436L is rotated forwardly or rearwardly with respect to a neutral position. Forward rotation or rear rotation of control handle 436R and the right L-shaped portion of handlebar 34 similarly adjusts transmission of power from propulsion unit 28 to the right traction member 426R.

Control transmission 438 facilitates communication between the motion or movement of control handles 436 and the transmission of propulsion unit 428. Control transmission 438 comprises sensors 460L, 460R (collectively referred to as sensors 460) and motor controller 462. Sensors 460 comprise sensors to detect the positioning of control handles 436. In the example illustrated, sensors 460 comprise potentiometers. In other implementations, sensor 460 may comprise other types of sensors.

Motor controller 462 comprises a processor or application-specific integrated circuit which, in response to signals from sensors 460, independently or uniformly adjusts the direction and/or speed at which motors 429 drive traction members 426. In one implementation, snow thrower 420 is configured to facilitate reverse rotation of one of traction members 426 relative to the other of traction members 46 which is driven forwardly to facilitate sharp turns.

Figure 7:
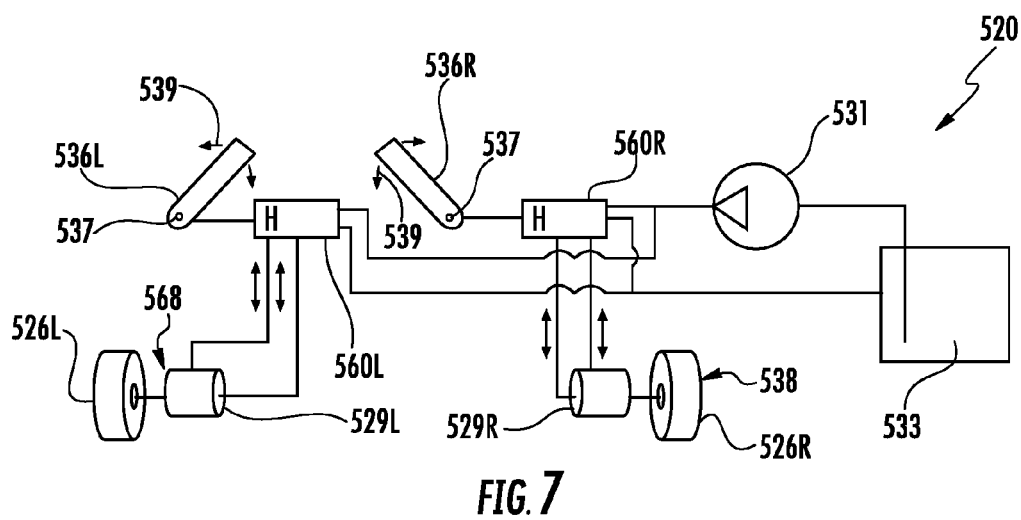
FIG. 7 is a schematic diagram of another example utility implement.

FIG. 7 schematically illustrates snow thrower 520 another implementation of snow thrower 20. Snow thrower 520 comprises frame 22, snow discharger 24 and handlebar 34 as illustrated and described above. Snow thrower 520 additionally comprises traction members 526L, 526R (collectively referred to as traction member 526), propulsion unit 528, control handles 536L, 536R (collectively referred to as control handles 536) and control transmission 538. Traction members 526 comprise wheels. In other implementations, traction members 526 may comprise driven belts, webs or tracks.

Propulsion unit 528 comprises hydraulic/pneumatic propulsion unit including a transmission for transferring power to traction members 526. In the illustrated example, propulsion unit 528 comprises a left hydraulic motor 529L to drive traction member 526L and a right hydraulic motor 529R to drive traction member 526R (collectively referred to as motors 529). Motors 529 are powered by hydraulic pump 531 pumping hydraulic fluid supplied by reservoir 533. In the example illustrated, each of motors 529 are independently operable to drive traction members 526 at different speeds.

Control handles 536 are similar to control handles 36 in that control handles 536 project or extend from handlebar 34. In the example illustrated, control handles 536 are rotatable about axes 537 as indicated by arrows 539. Such actuation results in adjustment of the operation of the speed and/or direction at which traction members 526 are driven by motors 529. In other implementations, control handles 536 are alternatively configured to be moved or repositioned in other fashions, such as by being linearly moved in either a longitudinal direction or a transverse direction.

In another implementation, handlebar 34 may comprise two independently movable L-shaped members, wherein control handles 536, in lieu of comprising joysticks projecting from handlebar 34, alternatively comprise inwardly the extending and independently movable ends of handlebar 34 itself. In such an implementation, the two independently movable L-shaped members pivot relative to frame 22 and relative to one another about a transverse horizontal axis, wherein such movement results in different operational parameters for snow thrower 520. For example, forward movement of control handle 536L and the left L-shaped portion of handlebar 34 results in forward movement of the left traction member 526L and rearward movement control handle 536L and the left L-shaped portion of handlebar 34 results in rearward movement or reverse rotation of the left traction member 526L. Speed is adjusted based upon the angular extent at which the control handle 536L is rotated forwardly or rearwardly with respect to a neutral position. Forward rotation or rear rotation of control handle 536R and the right L-shaped portion of handlebar 34 similarly adjusts transmission of power from propulsion unit 28 to the right traction member 526R.

Control transmission 538 facilitates communication between the motion or movement of control handles 536 and propulsion unit 528. Control transmission 538 comprises directional control valves 560L, 560R (collectively referred to as valves 560). Valves 560 proportion both flow rate and direction of flow across the motors 529 in response to the positioning of control handles 436 to independently or uniformly adjust the direction and/or speed at which motors 529 drive traction members 526. In one implementation, snow thrower 420 is configured to facilitate reverse rotation of one of traction members 526 of the other of traction members 526 is driven in a forward direction to facilitate sharp turns.

Figure 8:
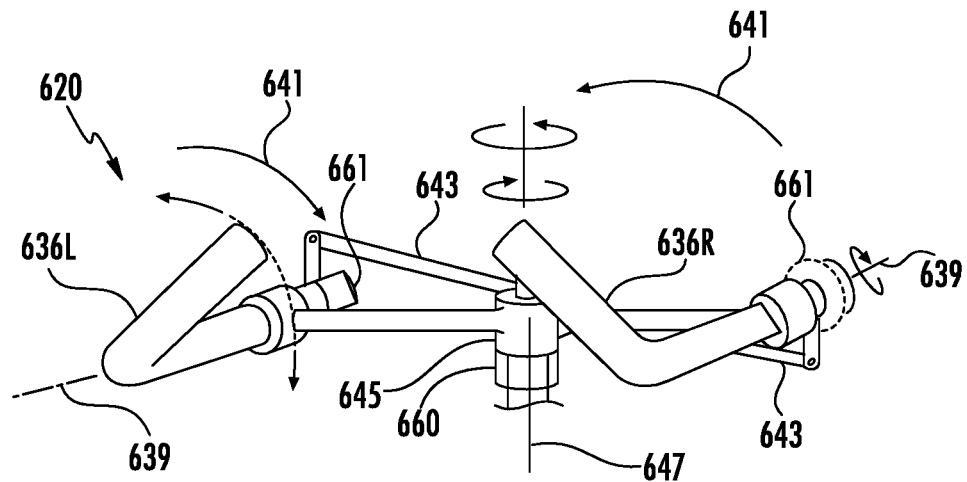
FIG. 8 is a schematic diagram of another example utility implement, illustrating an example of linked controls of an example snow thrower.

FIG. 8 illustrates snow thrower 620, another example implementation of snow thrower 20. Similar to snow thrower 20, snow thrower 620 comprises snow discharger 24. Snow thrower 620 is similar to snow thrower 420 except that snow thrower 620 comprises control handles 636L, 636R (collectively referred to as control handles 636) and control transmission 638 in place of control handles 436 and control transmission 428. Control handles 636 comprise L-shaped members having inwardly or upwardly turned ends facilitating wrapping gripping by an operator. Each of control handles 636 is rotatable about a longitudinal axis 639 as indicated by arrow 641. Such rotation facilitates adjustment of the propulsion provided to traction members 426 by motors 429 under the control of motor controller 462 (shown in FIG. 6).

Control transmission 638 is similar to control transmission 438 except that control transmission 638 utilizes links 643 and rotational position sensor 660. Links 643 are pivotably connected between their associated control handle 636 and a central hub 645 such that rotation of handles 636 is in unison. For example, pivoting of handle 636L in a counterclockwise direction also results in rotation of handle 636R in a clockwise direction, and vice versa. Sensor 660 senses rotation of hub 645 about axes 647 and generates signals which are transmitted to motor controller 462. In one implementation, rotation of both of control handles 636 to the left (both handles being rotated in a counterclockwise direction as seen from the rear of snow thrower 620) results in motor controller 462 generating control signals so as to drive traction member 426R to a greater extent or speed as compared to traction member 426L to facilitate a left turn. Rotation of both of control handles 636 to the right (both handles be rotated in a clockwise direction as seen from the rear of snow thrower 620) results in motor controller 643 generating control signals so as to drive traction member 426L to a greater extent or speed as compared to traction member 426R to facilitate a right turn. In other implementations, snow thrower 620 alternatively utilizes a rotational sensor 661 (shown broken lines) associated with each of control handles 636, wherein links 646 are omitted to permit control handles 636 to be independently rotated.

Figure 9:
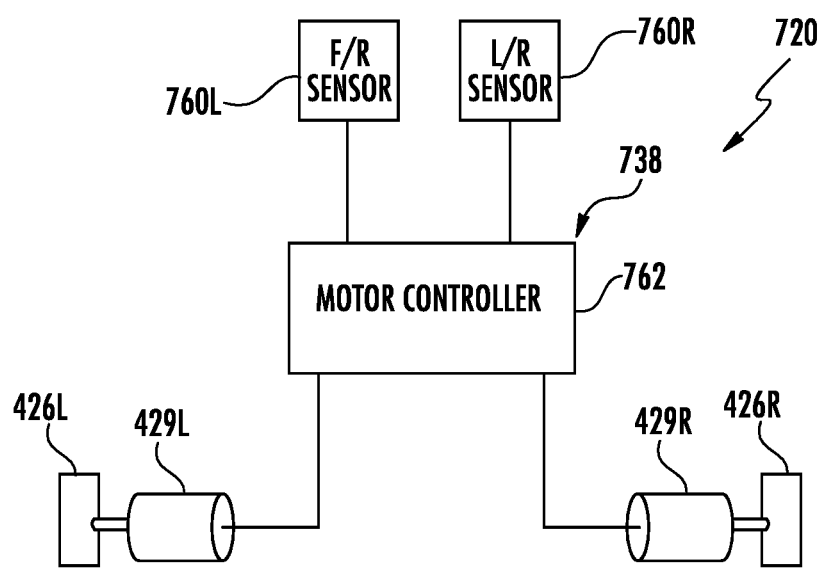
FIG. 9 is a schematic diagram of another example utility implement.

FIG. 9 schematically illustrates snow thrower 720, another implementation of snow thrower 20. Snow thrower 720 is similar to snow thrower 420 except that snow thrower 720 is specifically illustrated such that actuation of control handle 436L (shown in FIG. 6) changes the front/rear operational parameter of snow thrower 720 while actuation of control handle 436R (shown in FIG. 6) changes the left/right relative driving of traction members 426. As with snow thrower 420 snow thrower 720 comprises motors 429 which rotationally drive traction members 426L and 426R, respectively. Snow thrower 720 comprises control transmission 738 in place of control transmission 438. Control transmission 738 comprises sensors 760L, 760R (collectively referred to as sensors 760) and motor controller 762.

Sensors 760 communicate with motor controller 762. Sensor 760L senses rotation or positioning of control handle 436L. Sensor 760R senses rotation or positioning of control handle 436R. In response to signals from sensor 760L, motor controller 762 generates control signals adjusting the operation of motors 429 so as to switch motors 429 between a first state in which traction members 426 are driven in a forward driving state and a second state in which traction members 426 are driven in a reverse driving state. For example, in one implementation, rotation of control handle 636 about axis 639 as indicated by arrow 641 from a neutral position results in the generation of control signals that cause motors 429 to drive traction member 426 forward. Rotation of control handle 636 about axis 639 in the direction opposite that indicated by arrow 641 from the neutral position results in the generation of control signals that cause motors 429 to drive traction members 426 in a reverse direction.

In response to signals from sensor 760R, motor controller 762 generates control signals adjusting the operation of motors 429 such that traction members 426 are not driven at the same speed or with the same torque, facilitating turning or unequal torque application. For example, in one implementation, rotation of control handle 638 about axis 647 in the direction indicated as "right turn" (FIG. 8) from a neutral position results in the generation of control signals that cause motor 429L to drive traction member 426L at a greater rate as compared to the driving attraction member 426R by motor 429R to facilitate a right turn. Rotation of control handle 638 axis 647 in the direction indicated in "left turn" (FIG. 8) from the neutral position results in the generation of control signals a cause motor 429R to drive traction member 426R at a greater rate as compared to the driving attraction member 426L by motor 429L to facilitate a left turn.

Figure 17:
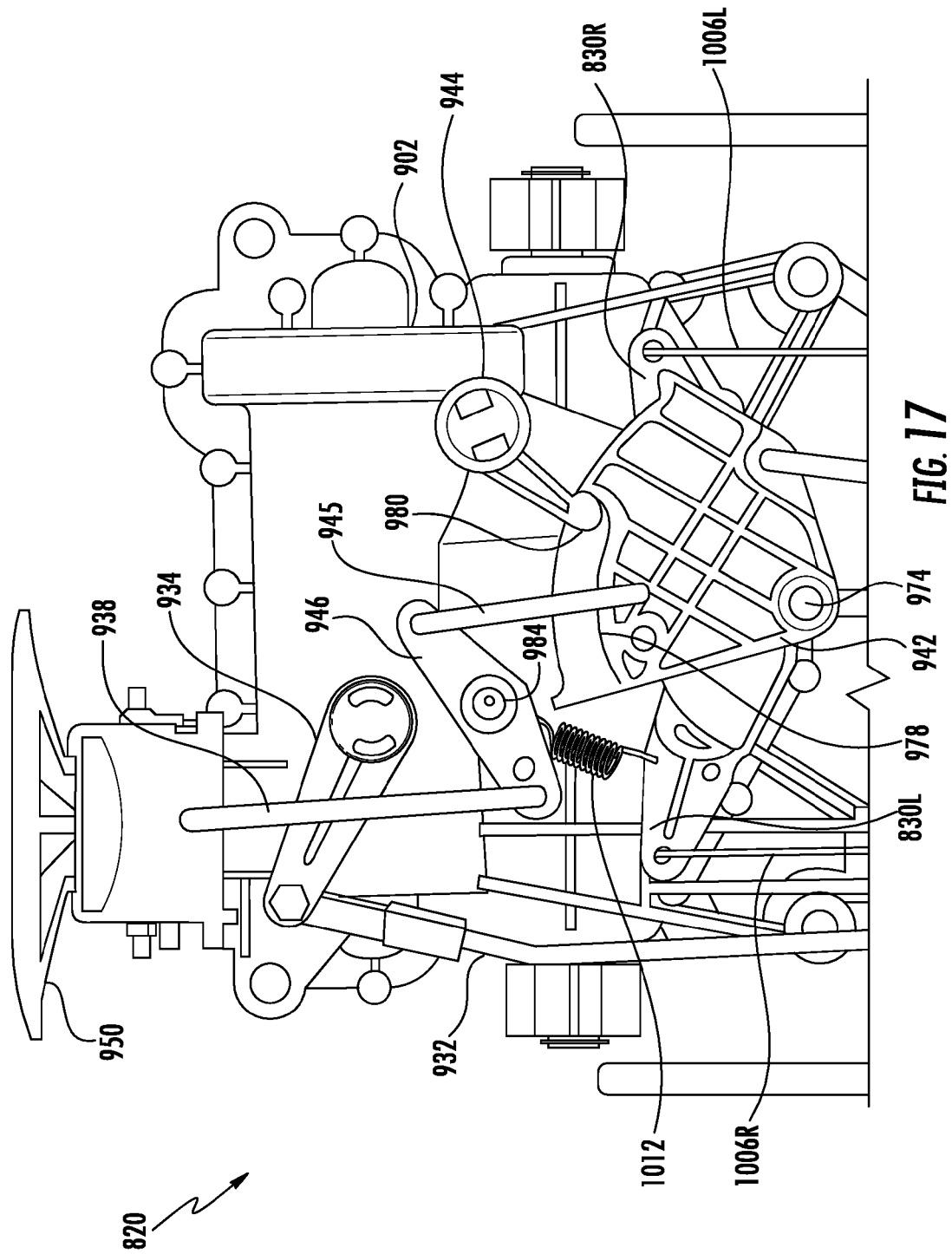
FIG. 17 is a top view of a portion of the utility implement of FIG. 10.

FIGS. 10-24 illustrate snow thrower 820, an example implementation of snow thrower 20. Snow thrower 820 comprises frame 822, snow discharger 824; traction members 826L, 826R (collectively referred to traction members 826), propulsion unit 828, left traction member disengager 830L and right traction member disengager 830R (collectively referred to as traction member disengagers 830, shown in FIG. 17), handlebar 834, left control handle 836L and right control handle 836R and control transmission 838. Frame 822 comprises a structure serving as platform, housing an enclosure for snow thrower 820. Frame 822 supports the remaining components of snow thrower 820.

Snow discharger 824 comprises a mechanism to break up accumulated snow and to discharge, impel or propel such snow. In the example illustrated, snow discharger 824 comprises a two-stage snow discharger comprising both an auger to break up snow and an impeller to impel or throw snow. In other implementations, snow discharger 824 may comprise a single stage snow thrower in which a single rotatably driven member breaks up snow and impeller throws snow. Snow discharger 824 comprises auger housing 840, auger 42 (shown in FIG. 1), auger drive 44 (shown in FIG. 1), impeller housing 846, impeller 48 (shown FIG. 1) and chute 850. Auger housing 840 extends about auger 42 and rotationally supports auger 42.

Impeller housing 846 extends rearwardly from our housing 42 and receives snow gathered by auger 42. Impeller 48 comprise a rotationally driven member which impels snow upwardly through chute 850. In the example illustrated, both augur 42 and impeller 48 are rotationally driven utilizing power or torque received from propulsion unit 828. Chute 850 extends from impeller housing 846 and directs snow impelled by impeller 48. In the example illustrated, chute 850 is rotatable such that snow may be directed to either side or at various angles with respect to snow thrower 820.

Traction members 826 comprise member supported by frame 822 in engagement with the ground or underlying terrain. Traction members 826 are operably coupled to propulsion unit 828 so as to be driven and powered by propulsion unit 828 to drive snow thrower 820. In the example illustrated, traction members 826 comprise wheels. In yet another implementation, traction members 826 comprise webbed tracks wrapping about driving wheels or driving sprockets. In the example illustrated, traction members 826 are independently drivable such that one may be driven while the other is not driven, facilitating powered turning through the use of traction member disengagers 830.

Propulsion unit 828 comprise a device to supply torque or power to traction members 826. Propulsion unit 28 comprises a power source, such as an internal combustion engine 900, which is operably coupled to traction members 826 by a transmission 902 (shown in FIG. 11). The transmission 902 utilizes one or more gear trains, a belt and pulley arrangement, the chain and sprocket arrangement or combinations thereof to transmit torque supplied by the internal combustion engine 900 to the traction members 826. The transmission of power is controllable through the use of one or more clutches, movable and actuatable idler gears, variators or similar mechanisms. In the example illustrated, transmission 902 utilizes a variator to adjust the speed at which traction members 826 are driven. In other implementations, other speed adjusting mechanisms to utilize to adjust speed and torque transmitted through transmission 902.

Traction member disengagers 830 comprise mechanisms to selectively and independently disengage propulsion unit 828 from the individual traction members 826. Traction member disengager 830L, when actuated, disengages left traction member 826L from propulsion unit 828 independent of the state of right traction member 826R. Likewise, right traction member disengager 830R, when actuated, disengages right traction member 826R independent of the state of left traction member 826L. in one implementation, traction member disengagers 830 comprise clutches. In other implementations, traction member disengages 830 may comprise other mechanisms which operably interact with the transmission between the power source of propulsion unit 828 and traction members 826 to interrupt the transmission of power to traction members 826. In some implementations, traction member disengages 830 may be omitted, wherein traction members 826 rotate in unison.

Handlebar 834 comprises a curved steering bar or rod extending from frame 822. In the example illustrated, handlebar 834 projects upwardly and rearwardly from frame 822, providing a horizontal bar or rod at a height from and between the height of an operator's waist to the height of an operator's shoulders. Handlebar 834 provides gripping surfaces by which an operator may push, pull or maneuver snow thrower 820 while snow thrower 820 is not under power. In the illustrated, handlebar 834 supports much of control transmission 838. Although handlebar 834 is illustrated as comprising two opposing L-shaped members, in other implementations, handlebar 834 alternatively comprise a U-shaped member.

Control handles 836 comprise handles projecting from handlebar 834 which are located so as to be gripped by an operator while the operator is maneuvering the snow thrower 820 and as a snow thrower 820 is being driven by traction members 826, wherein control handles 836 are actuatable to adjust at least one operational parameter of snow thrower 820 while the operator is allowed to continue to maintain his or her grip upon such control handles 836. In the example illustrated, each of control handles 836 are configured in the form of joysticks or rods, providing cylindrical or substantially cylindrical structures sized such that an operator's hand may be wrapped about handles 836, wherein handles 836 are gripped between a person's thumb and fingers. As a result, a person may utilize both of his or her hands to control the one of more parameters of snow thrower 820 while snow thrower 820 is being driven. The maneuvering of snow thrower 820 does not need to be interrupted to change the one or more operational parameters. Moreover, the control of snow thrower 820 is continuous and intuitive.

Control transmission 838 comprises one or more devices by which actuation of control handles 836 is communicated to operational components of snow thrower 820 to adjust operational parameters of snow thrower 820.

FIGS. 11-17 illustrate an example control transmission 838 in a neutral state. In the neutral state, the transmission 902 is disengaged from engine 900 while the transmission is resiliently biased to a forward driving state at zero velocity. In the neutral state, transmission 902 is engaged with each of traction members 826 so as to drive each of traction members 826 once the transmission has been engaged and forward or reverse velocity input has been received.

Figure 10:
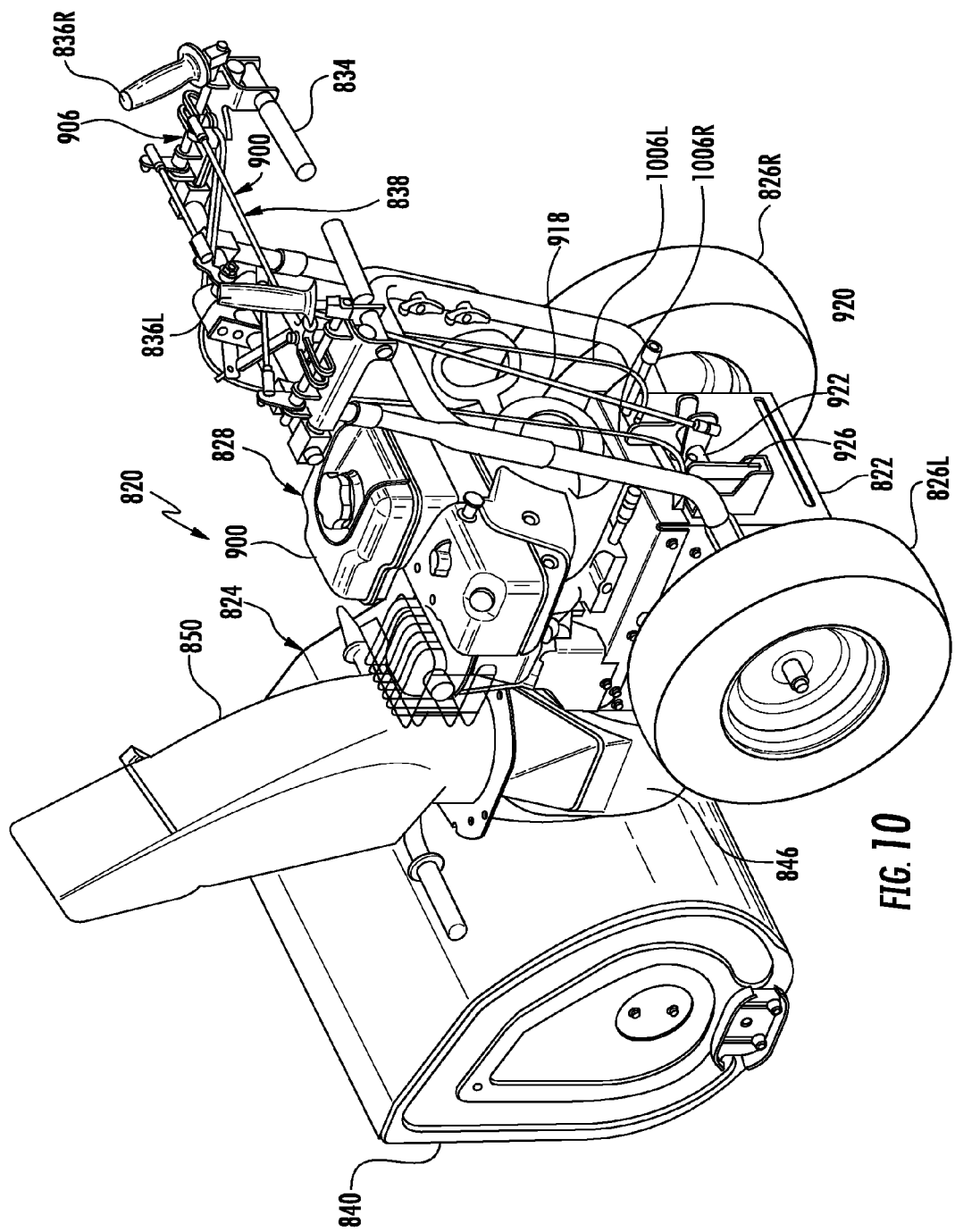
FIG. 10 is a rear perspective view of an example utility implement, shown as a snow thrower.
Figure 13:
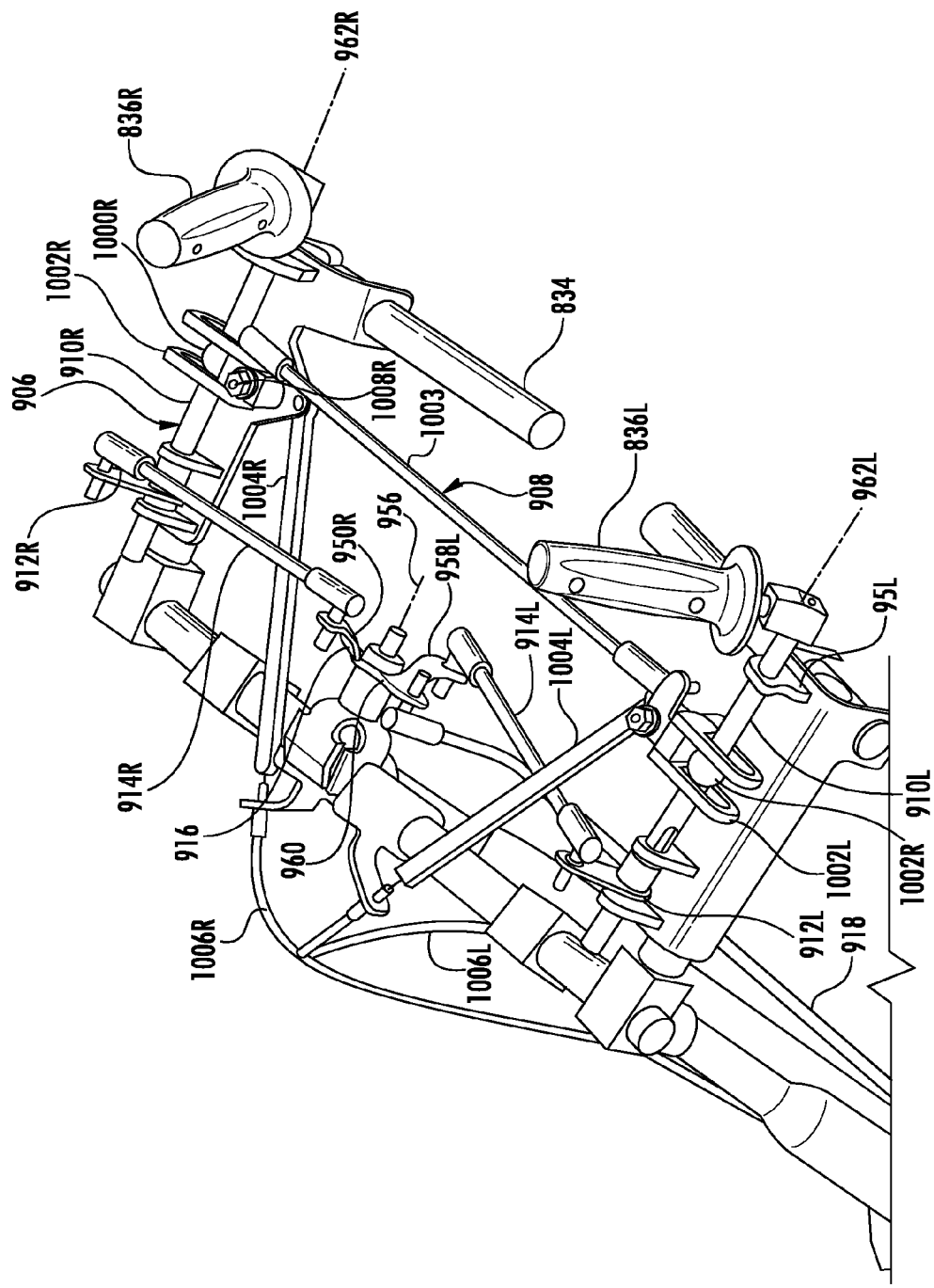
FIG. 13 is a rear perspective view of a portion of utility implement of FIG. 10.
Figure 14:
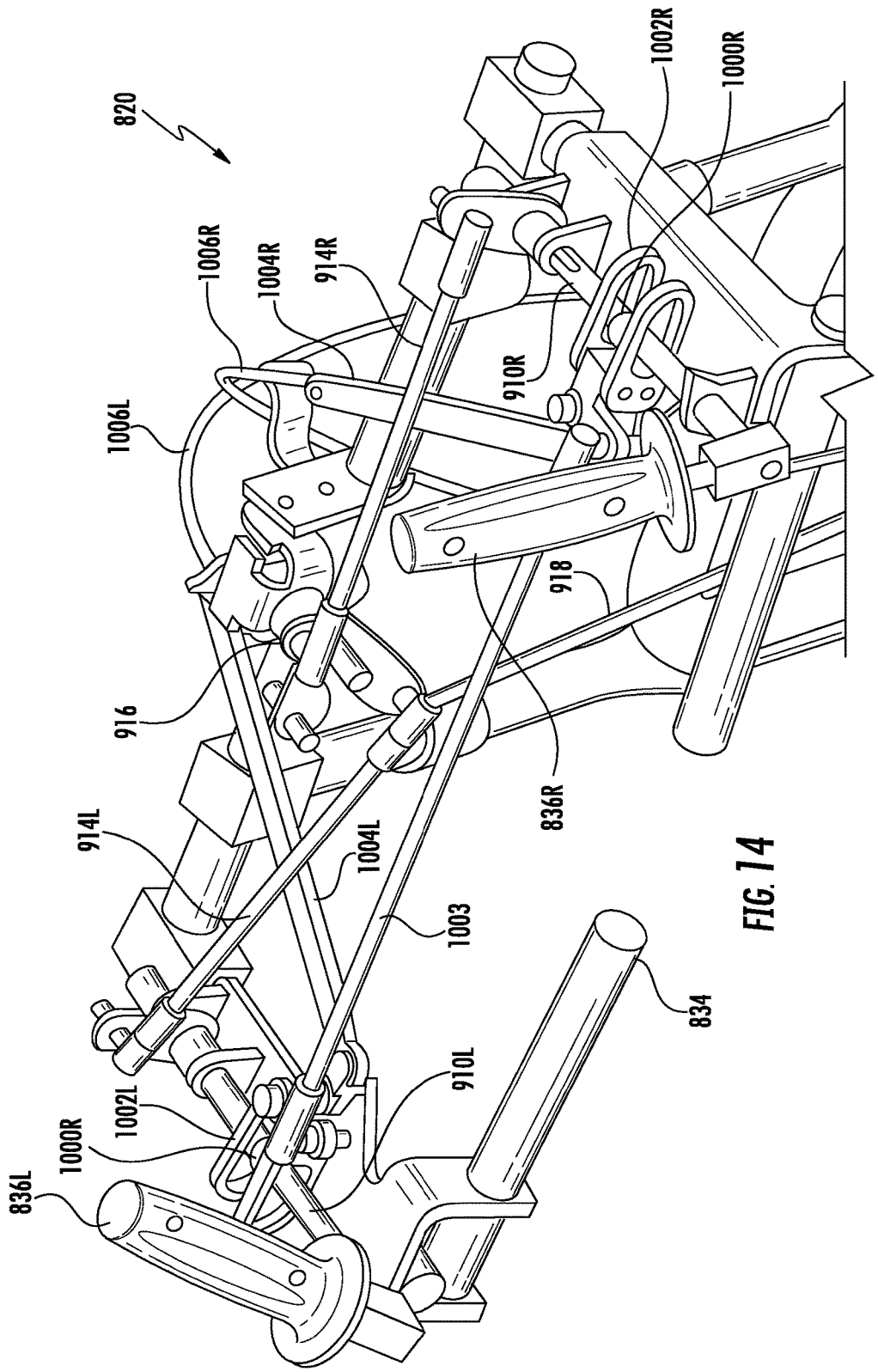
FIG. 14 is a rear perspective view of a portion of utility implement of FIG. 10.
Figure 15:
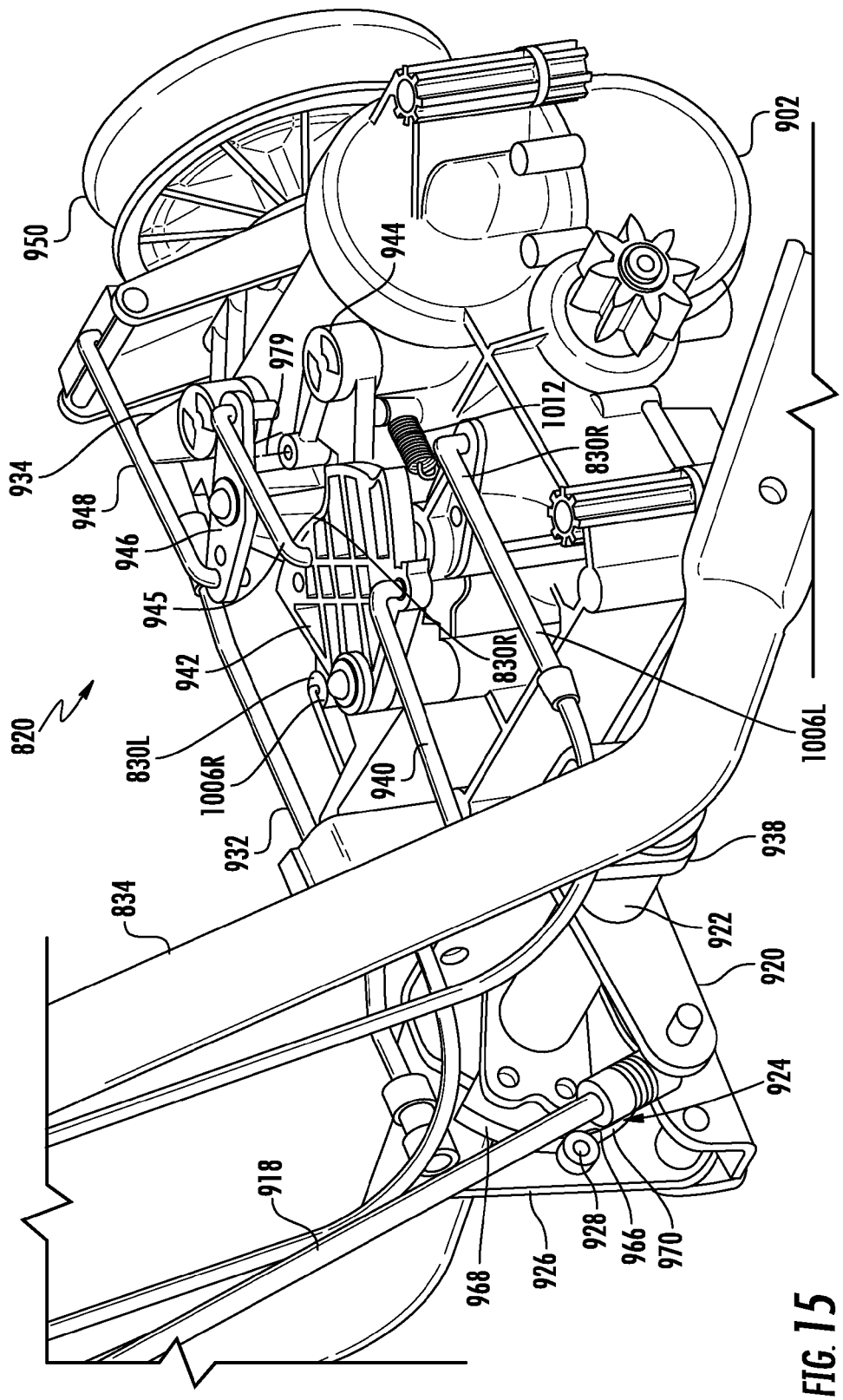
FIG. 15 is a rear perspective view of a portion of the utility implement of FIG. 10.
Figure 16:
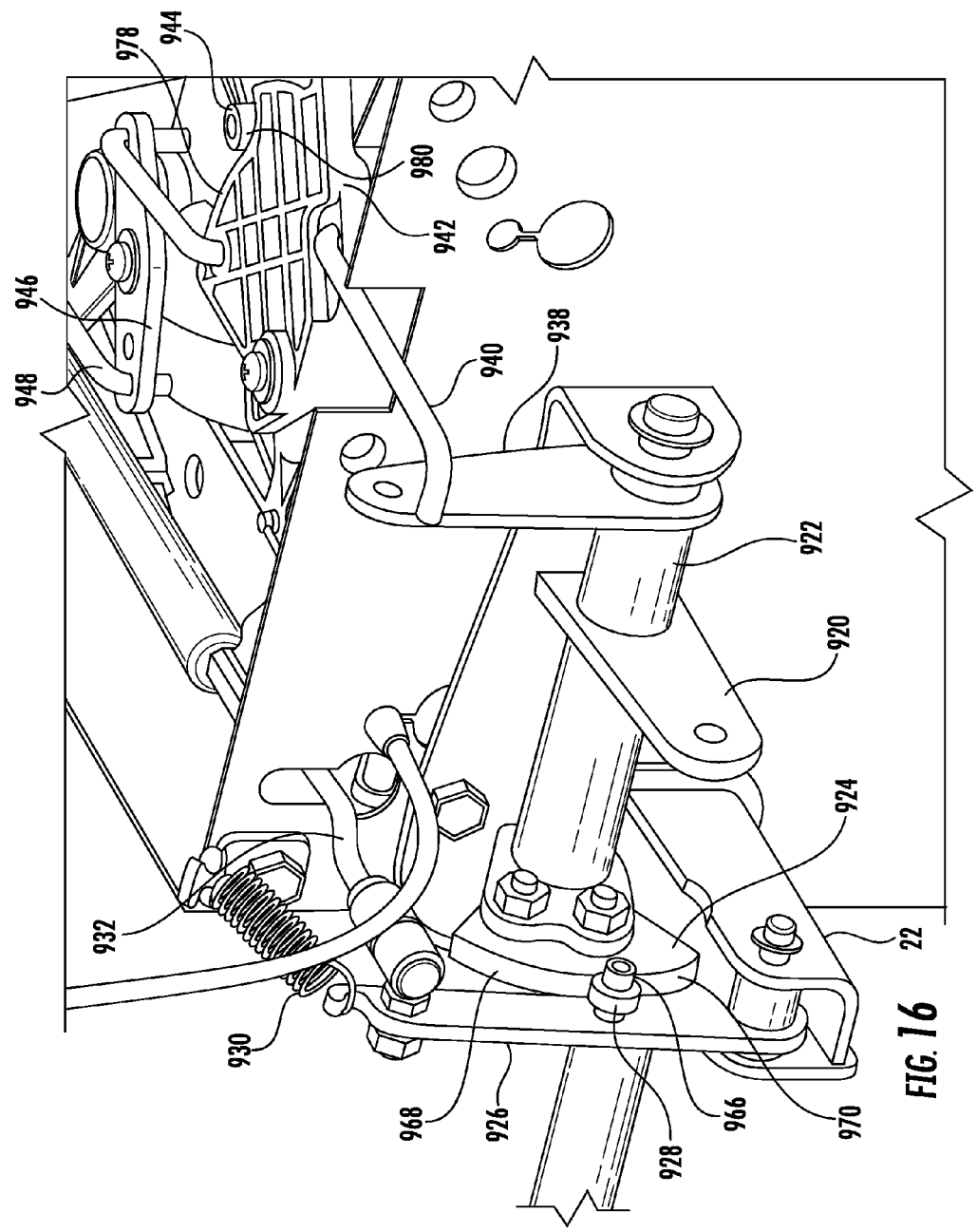
FIG. 16 is an enlarged rear perspective view of a portion of the utility implement of FIG. 10.

As shown by FIG. 10, control transmission 838 comprises a forward-reverse, speed control portion 906 and a steering control portion 908. Forward-reverse, speed control portion 906 facilitates adjustment of the forward-reverse state of transmission 902 as well the speed at which traction members 826 are driven. As shown by FIG. 13, portion 906 comprises pivot shafts 910L, 910R (collectively referred to as pivot shafts 910), arms 912L, 912R (collectively referred to as arms 912), control rods 914L, 914R (collectively referred to as control rods 914), crank 916, transmission rod 918, pivot arm 920, pivot shaft 922, cam 924, actuation lever 926 cam follower 928, spring 930, actuation rod 932, transmission actuation lever 934, shift arm 938, shift rod 940, transmission speed control lever 942, forward-reverse actuation lever 944, linkage 945, swivel arm 946, linkage 948 and variator 950. Pivot shafts 910 comprise shafts extending from control handles 836 while being rotationally supported or guided by bearing or bushing guides 952 extending from handlebar 834. Shafts 910 rotate about their own centerline or axis. Arms 912 extend from shafts 910 and are fixed to shafts 910 so as to rotate in unison with shafts 910. Arms 912 are pivotally connected to control rods 914. Control rods 914 extend from arms 912 and are pivotally connected to opposing portions of crank 916. Crank 916 is rotationally supported by handlebar 834 for rotation about axis 956. Crank 916 comprises two crank arms 958L, 958R which are pivotally connected to ends of rods 914L and 914R, respectively. Crank 916 includes a third crank arm 960 pivotally connected to transmission rod 918. Crank 916 links control handles 836 such that control handles 836 rotate about axes 962L and 962R (collectively referred to as axes 962) in unison with one another. In the example illustrated, control handles 836 rotate either inwardly towards one another or outwardly away from one another. Rotation of control handles 836 about axes 962 resulting crank 916 pulling up or pushing down transmission rod 918.

Figure 11:
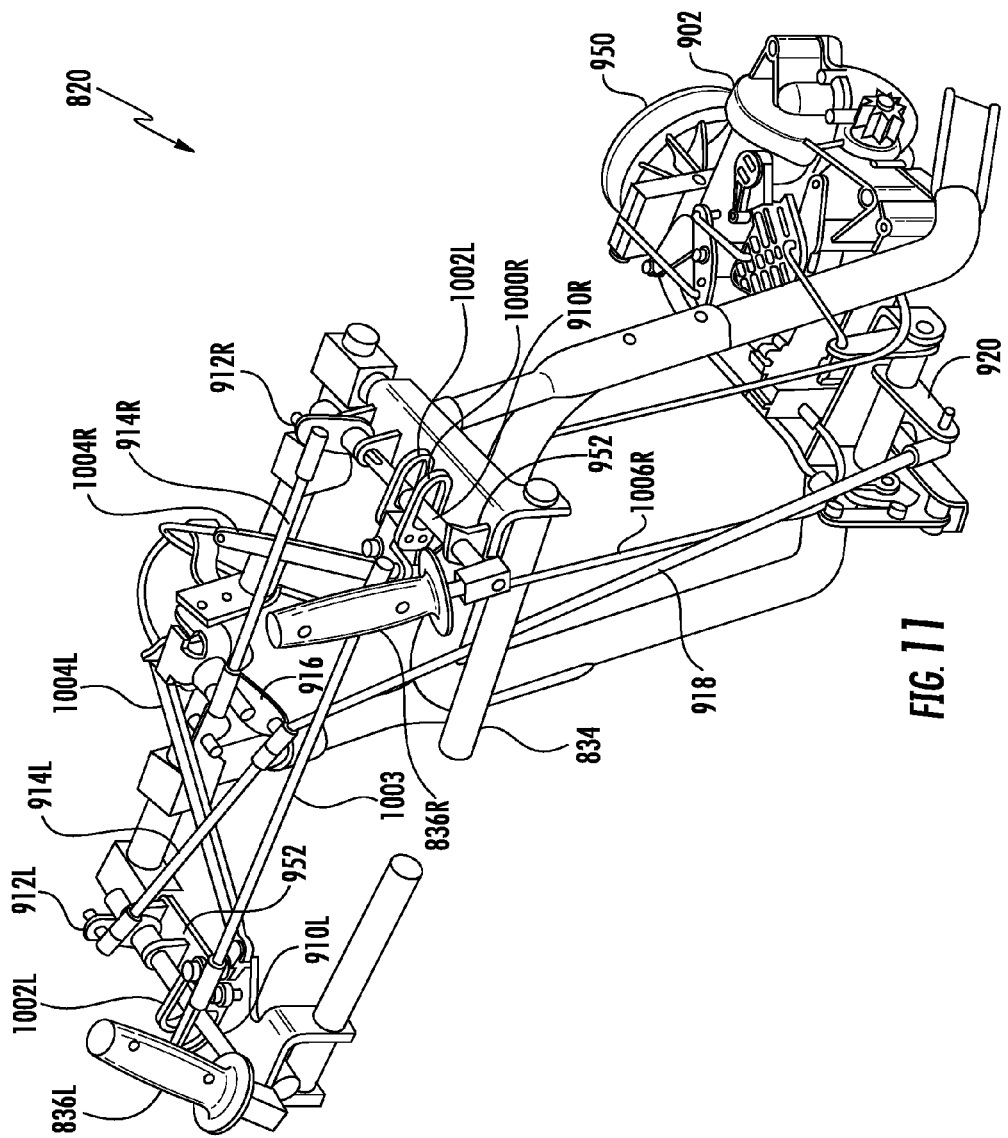
FIG. 11 is an enlarged rear perspective view of a portion of utility implement of FIG. 10, illustrating an example controls in a first position.
Figure 12:
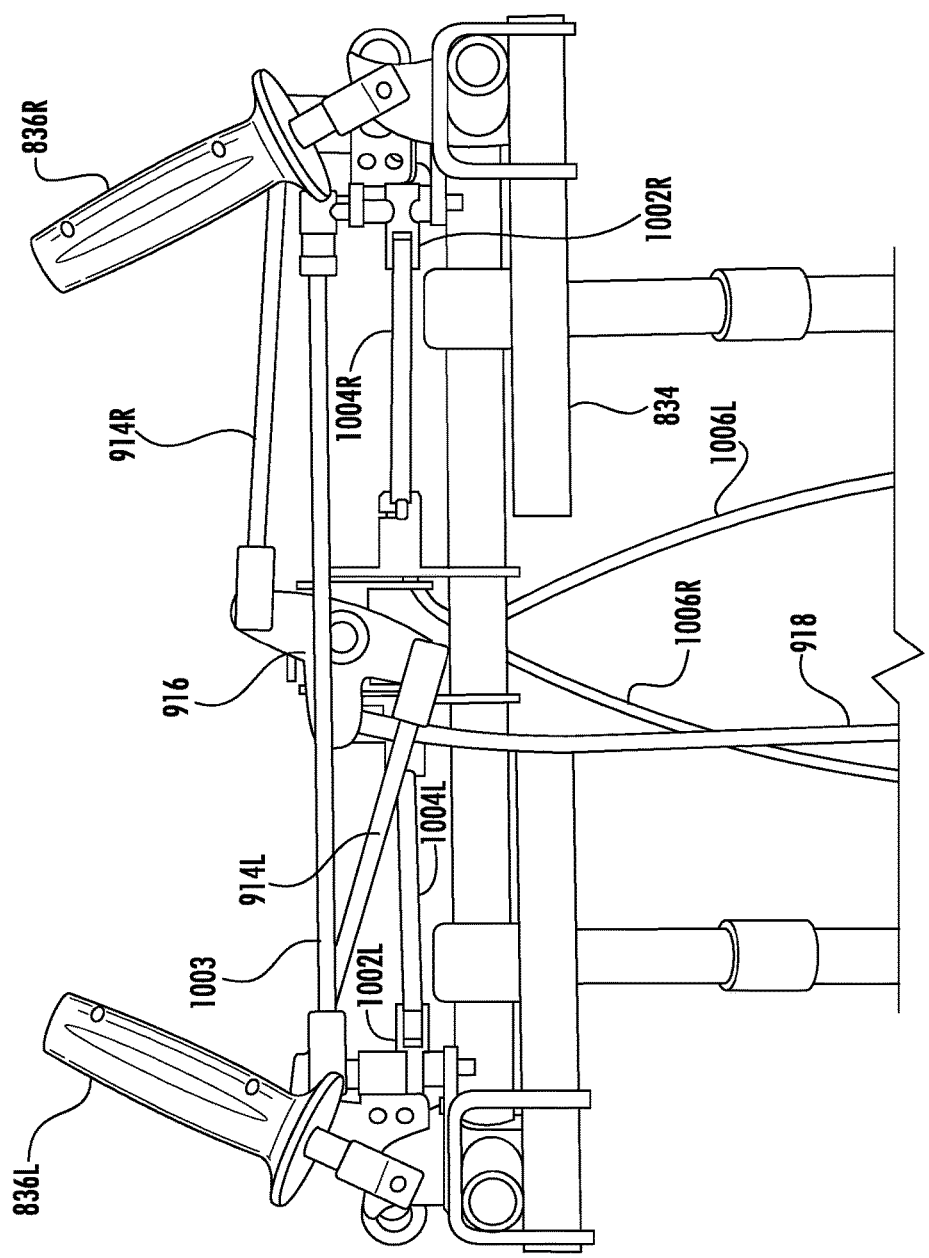
FIG. 12 is a rear perspective view of a portion of the utility implement of FIG. 10.

As shown by FIG. 11, transmission rod 918 extends from crank 916 to pivot arm 920, transmission rod 918 being pivotally connected to arm 920. Arm 920 is fixedly connected to pivot shaft 922 such that as transmission rod 918 is pushed or pulled, pivot shaft 922 is rotated. Pivot shaft 922 is rotationally supported by frame 22. Pivot shaft 922 supports and carries cam 924 and shift arm 938, both of which are fixed to pivot shaft 922 and rotate with the rotation of pivot shaft 922. Cam 924 comprises a structure providing a cam surface against which cam follower 928 rides. In the example illustrated, cam 924 comprises an arcuate surface having a neutral position indicating and retaining notch or detent 966, an upper forward driving cam surface 968 and a lower rearward driving cam surface 970. The detent 966 receives cam follower 928 when control handles 836 are in the neutral state or position. Surface 968 engages cam follower 928 when handles 836 are rotated inwardly towards one another and when propulsion 828 is in the forward driving state. Surface 970 engages cam follower 928 when handles 836 are rotated outwardly away from one another and when propulsion unit 828 is in the rearward driving state.

Actuation lever 926 comprises a lever rotationally supported by frame 22. Lever 926 carries cam follower 928. Spring 930 extends from frame 22 and resiliently biases lever 926 such that cam follower 928 is biased against cam 924. Actuation lever 926 is pivotally connected to actuation rod 932 which is pivotally connected to transmission actuation lever 934 (shown in FIG. 17). In the neutral state shown in which cam follower 928 is received within detent 966, actuation rod 932 and its connected lever 934 are maintained in a position which transmission 902 is disengaged from engine 900.

Shift arm 938 extends from shaft 922 and is pivotally connected to shift rod 940. Shift rod 940 extends from arm 938 and is pivotally connected to transmission speed control lever 942. Lever 942 is movably supported for rotation about axis 974 and comprises a cam surface 978 against which a cam follower 980 of forward-reverse lever 944 rides. Forward-reverse actuation lever 944 comprise a lever pivotably supported about axis 979 and configured to switch transmission 902 between a forward driving state and a rearward driving state. In one implementation, lever 944 is operably coupled to an idler gear so as to change transmission between different gear sets facilitating forward or reverse driving of traction members 826 by transmission 902. In the example illustrated, lever 944 is resiliently biased towards or to a position in which transmission 902 is retained in the forward driving state by a spring (not shown) coupled between frame 22 and lever 944. Rotation of speed control lever 942 results in cam surface 978 moving against cam follower 980 to move lever 944 against the bias of the spring to a reverse driving state.

Linkage 945 comprises a linkage pivotally connected to and extending from speed control lever 942 at one end and pivotally connected to swivel arm 946 at the other end. Swivel arm 946 comprises an arm rotationally supported for rotation about axis 984. Swivel arm 946 is connected to linkage 945 at one end and is pivotally connected to linkage 948 at another end. Linkage 948 extends from swivel arm 946 and is connected to variator 950. As a result, rotation of speed control lever 942 about axis 974 results in force being transmitted to variator 950 to adjust variator 950. Adjustment of variator 950 adjusts the speed at which transmission 902 is driven by engine 900.

Steering control portion 908 of control transmission 838 facilitates adjustment of the powered or driven steering of snow thrower 820 through the manipulation or movement of control handles 836. In the example illustrated, steering control portion 908 adjusts or actuates traction member disengagers 830 in response to movement of control handles 836. In the example illustrated, depending upon movement and positioning of control handles 836, steering control portion 908 disengages a selected one of traction members 826 from transmission 902 such that driven turning or steering of snow thrower 820 is achieved.

Steering control portion 908 comprises bumpers 1000L, 1000R (collectively referred to as bumpers 1000), steering forks 1002 (collectively referred to as steering forks 1002), coupling rod 1003, steering links 1004L, 1004R (collectively referred to as steering links 1004), and Bowden cables 1006L, 1006R (collectively referred to as cables 1006). Bumpers 1000 comprise structures projecting from and fixed to pivot shafts 910. Bumpers 1000 interact with and are captured between prongs of forks 1002 to pivot forks 1002 about axes 1008L, 1008R, respectively. Forks 1002 are pivotally supported by handle bar 834 for movement about axes 1008. Forks 1002 slidably receive shafts 910 and permit pivot shafts 910 to slide therethrough. Forks 1002 include prongs that capture bumpers 1000 such that linear movement of shaft 910 along axes 962 pivot forks 1002 about axes 1008. Coupling rod 103 is pivotally connected and opt sense to each of forks 1002. Coupling rod 1003 links movement of control handles 836. In other implementations, coupling rod 1003 may be omitted.

Steering links 1004 are each pivotally connected to forks 1002 at one end and are pivotally connected to Bowden cable 1006 at an opposite end. Bowden cables 1006 extend from links 1004 and are pivotally connected to activation levers 830 (shown in FIG. 17). Forward or rearward linear actuation of control handles 836 results in forks 1002 being pivoted about axes 1008 to push or pull steering links 1004 so as to push or pull Bowden cables 1006 so as to pivot or move traction member disengagement levers 830 against the bias of springs 1012 from a traction member engaged and driving state to a traction member disengaging state in which the corresponding traction member is no longer engaged by the transmission and is no longer being driven.

Figure 18:
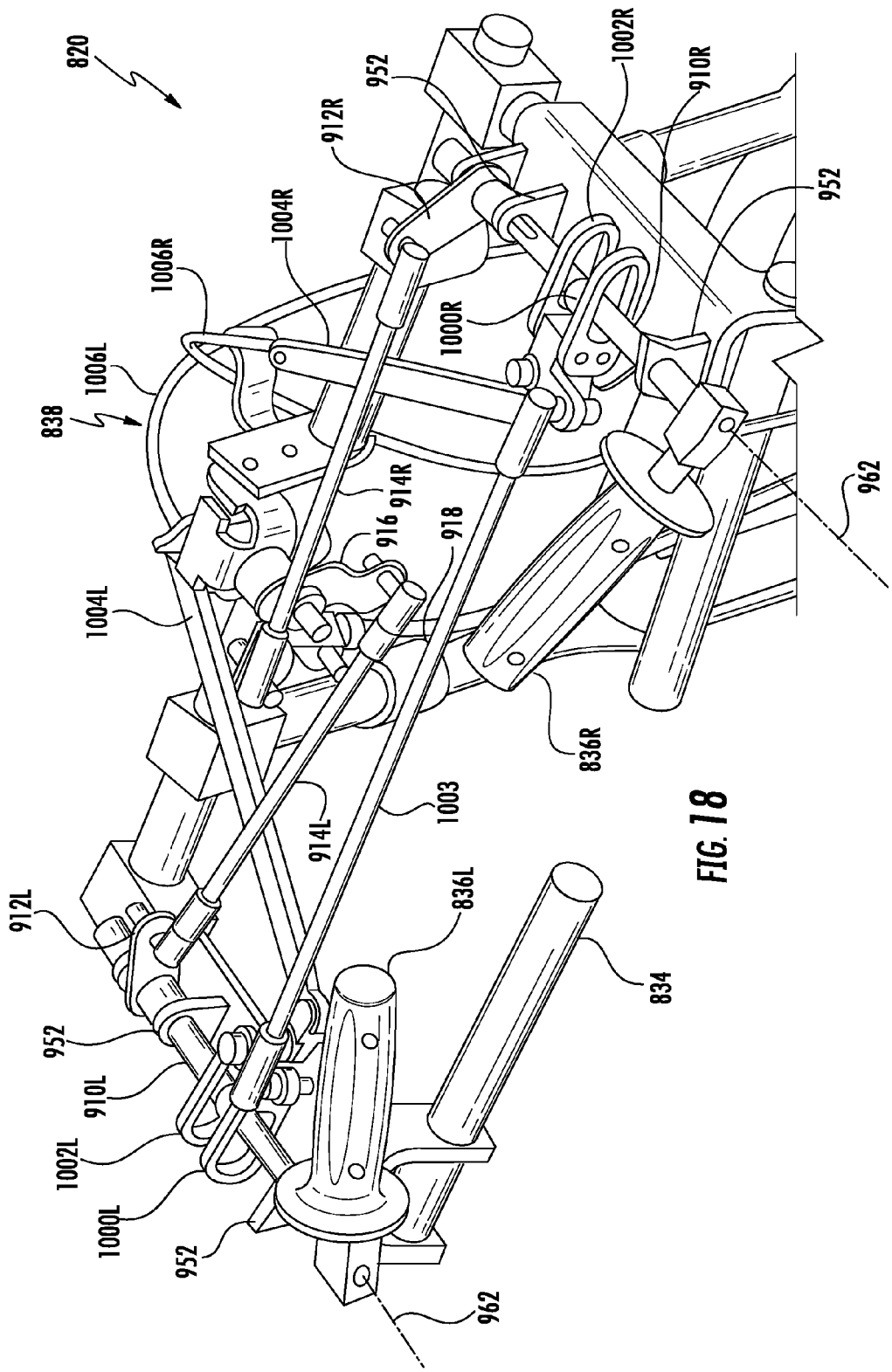
FIG. 18 is a rear perspective view of a portion of the utility implement of FIG. 10 illustrating controls in a second position.
Figure 19:
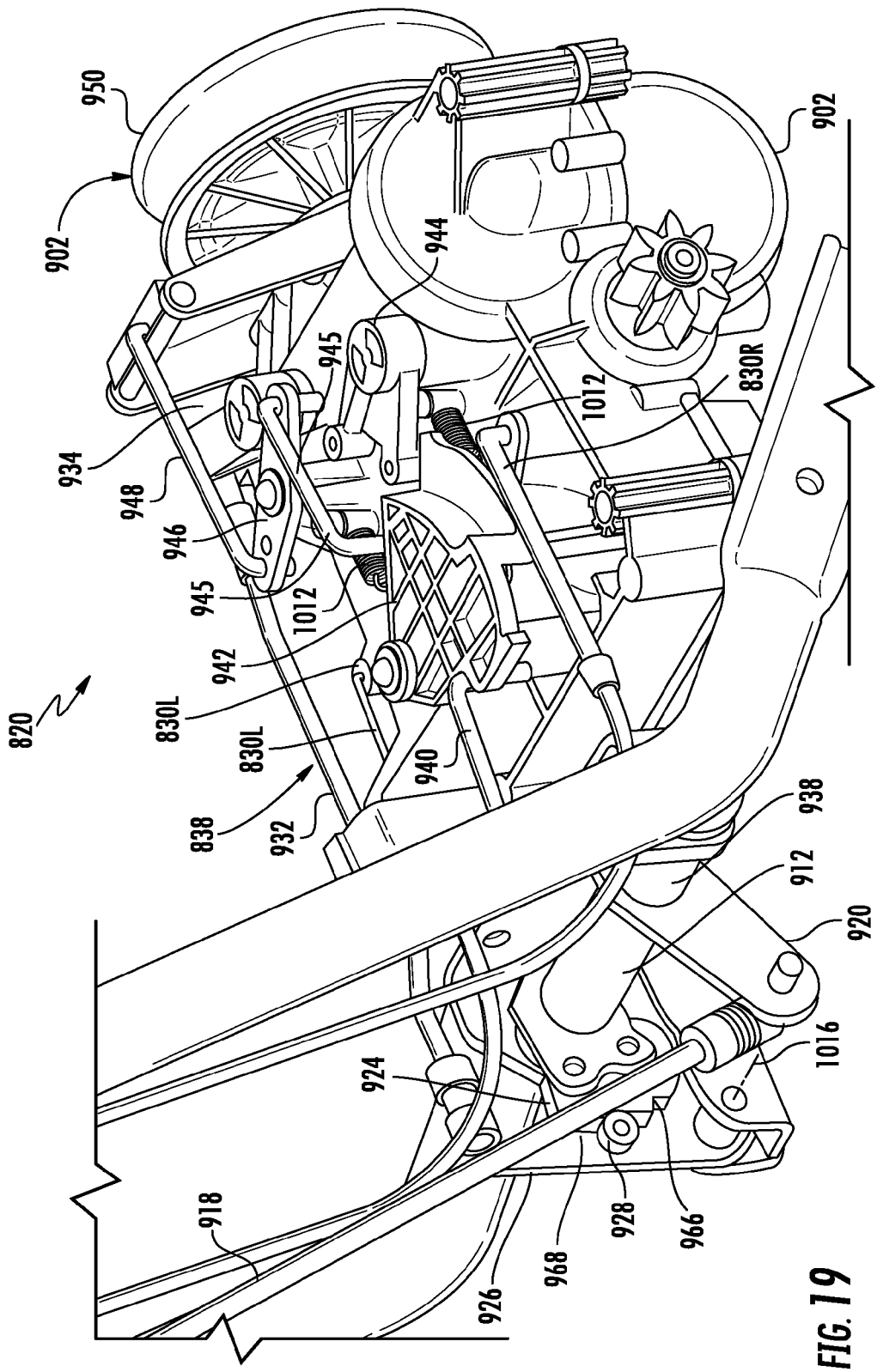
FIG. 19 is a rear perspective view of a portion of the utility implement of FIG. 18.

FIGS. 18-19 illustrate control handles 836 and control transmission 838 in a forward driving high speed state in which traction members 826 are driving snow thrower 820 in a forward direction at the highest available speed at a given throttle setting. As shown by FIG. 18, to actuate snow thrower 820 to the forward driving high speed state, control handles 836 are rotated inwardly towards one another about axes 962. As noted above, because control handles 836 are linked to one another through cam 916, rotation of one of handles 836 automatic results in corresponding rotation of the other of handles 836. Rotation of handles 836 towards one another rotates pivot shaft 910 to move rods 914 such that crank 916 is rotated to move transmission rod 918. As shown by FIG. 19, such pushing of transmission rod 918 rotates arm 920 and pivot shaft 922 so as to rotate cam 924 such that cam follower 928 becomes withdrawn from detent 966 and rides upon cam surface 968. As a result, lever 926 is rotated about axis 1016 so as to pull actuation rod 932 which moves lever 934 to engage transmission 902.

As shown by FIG. 19, rotation of shaft 922 further results in rotation of arm 938 which moves shift rod 940 so as to rotate transmission speed control lever 942. Rotation of speed control lever 942 moves linkage 945 so as to swivel arm 946 and move linkage 934 to adjust variator 950. At the same time, cam follower 980 of forward-reverse lever 944 continues to ride upon cam surface 978 and is continued to be resiliently biased to the forward driving state. In the example illustrated, the greater extent to which control handles 836 are pivoted or rotated towards one another results in speed control lever 942 also being rotated to a greater extent which results in variator 950 being adjusted to a greater extent to increase the speed at which transmission 902 drives traction members 826.

Figure 20:
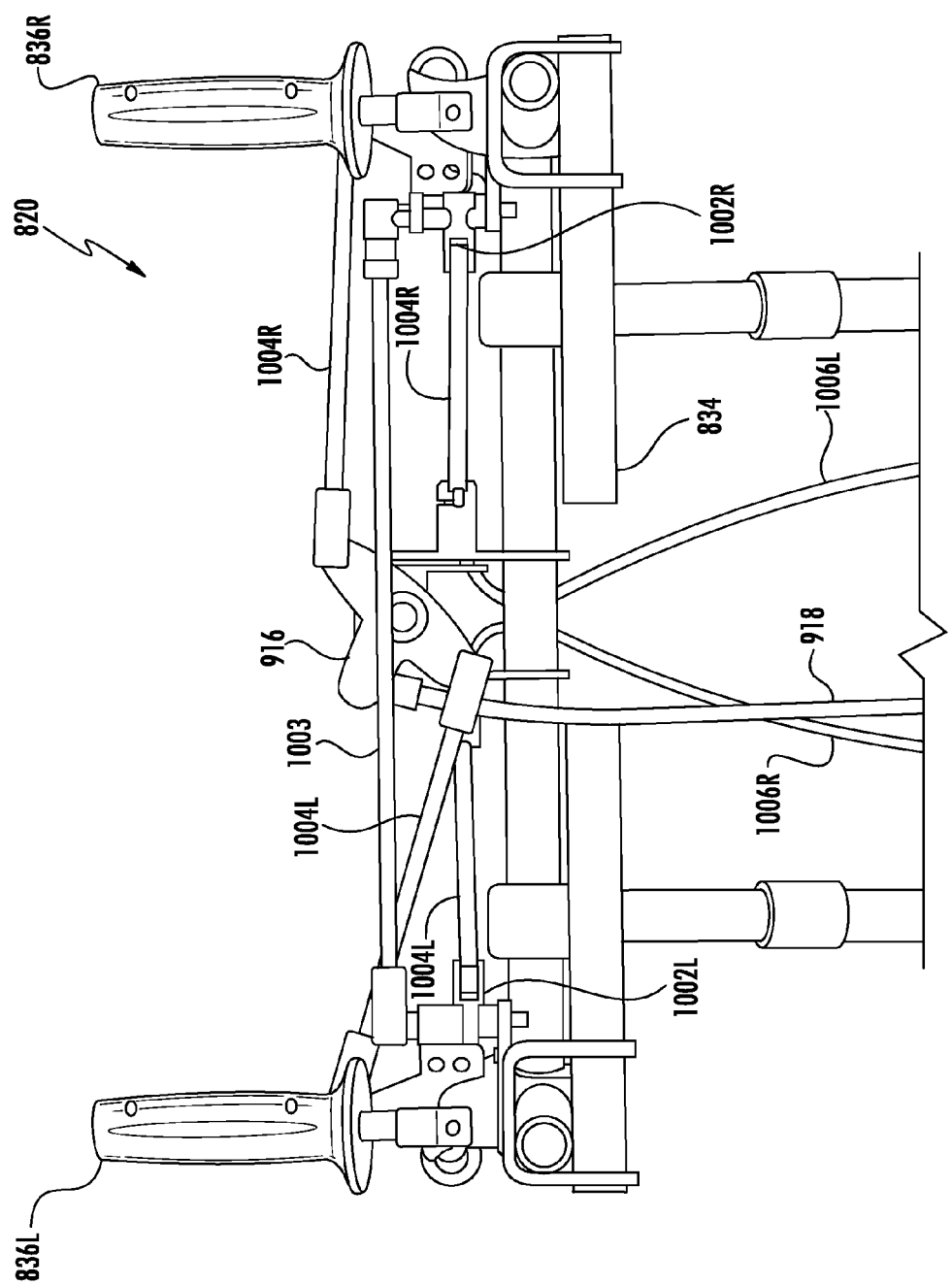
FIG. 20 is a rear perspective view of a portion of the utility implement of FIG. 10 with controlled in a third position.
Figure 21:
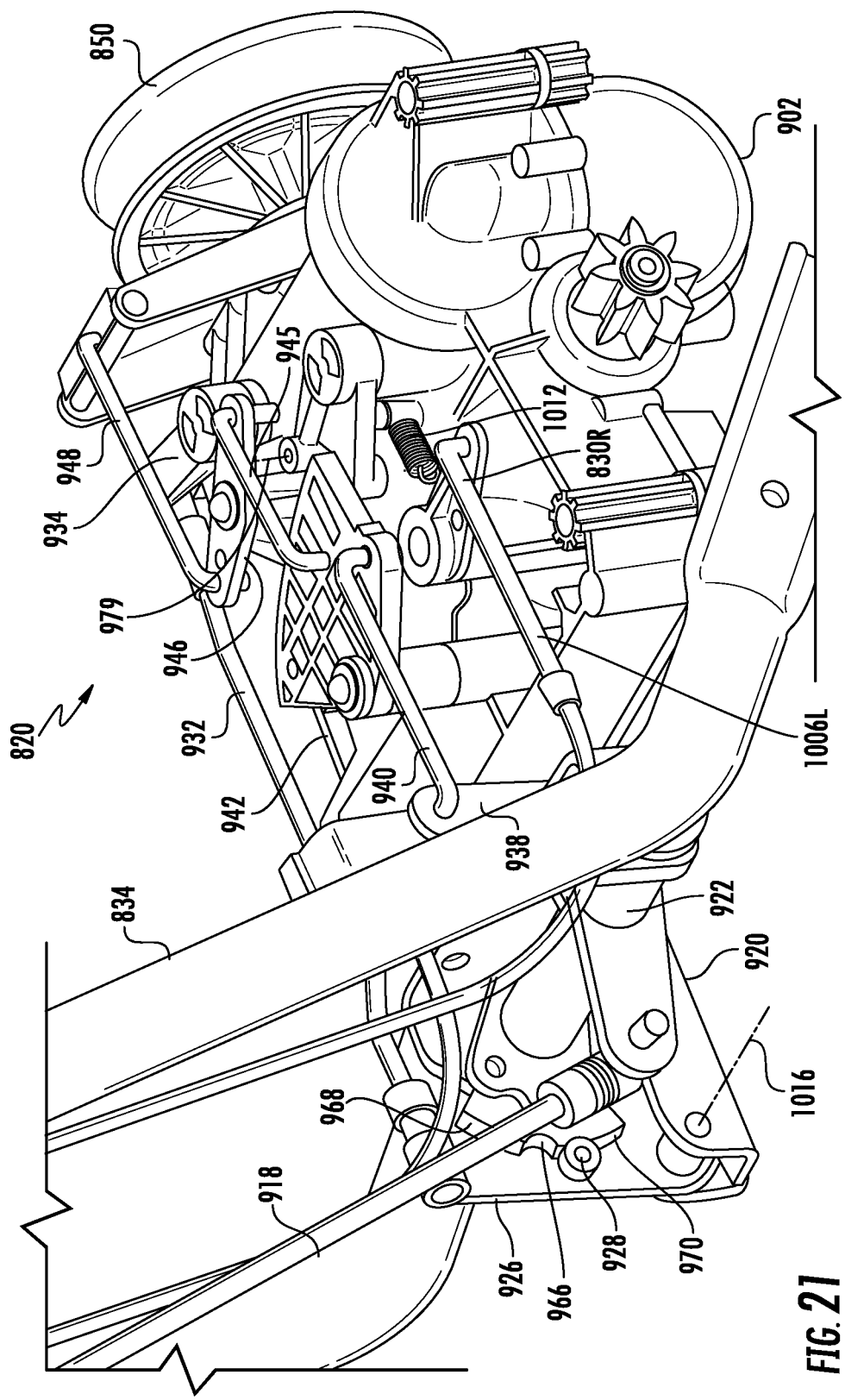
FIG. 21 is a rear perspective view of a portion of the utility implement of FIG. 20.

FIGS. 20 and 21 illustrate control handles 836 and control transmission 838 in a rearward driving high speed state in which traction members 8260 driving snow thrower 820 in a rearward direction at the highest available speed at a given throttle setting. As shown by FIG. 20, to actuate snow thrower 820 to the forward driving high speed state, control handles 836 are rotated outwardly away from one another about axes 962. As noted above, because control handles 836 are linked to one another through cam 916, rotation of one of handles 836 automatic results in corresponding rotation of the other of handles 836. Rotation of handles 836 away from one another rotates pivot shaft 910 to move rods 914 such that crank 916 is rotated to move transmission rod 918. As shown by FIG. 21, such pushing of transmission rod 918 rotates arm 920 and pivot shaft 922 so as to rotate cam 924 such that cam follower 928 becomes withdrawn from detent 966 and rides upon cam surface 970. As a result, lever 926 is rotated about axis 1016 so as to pull actuation rod 932 which moves lever 934 to engage transmission 902.

As shown by FIG. 21, rotation of shaft 922 further results in rotation of arm 938 which moves shift rod 940 so as to rotate transmission speed control lever 942. Rotation of speed control lever 942 in the reverse direction shown causes cam surface 978 to engage cam follower 980 so as to rotate forward-reverse lever 944 against the bias in the spring to a reverse date in which transmission 902 is actuated to a reverse driving state. Rotation of speed control lever 942 in the reverse direction further moves linkage 945 so as to swivel arm 946 and move linkage 934 to adjust variator 950. In the example illustrated, the greater extent to which control handles 836 are pivoted are rotated away from one another results in speed control lever 942 also be rotated to a greater extent which results in variator 950 being adjusted to a greater extent to increase the speed at which transmission 902 drives traction members 826 in the reverse direction.

Figure 22:
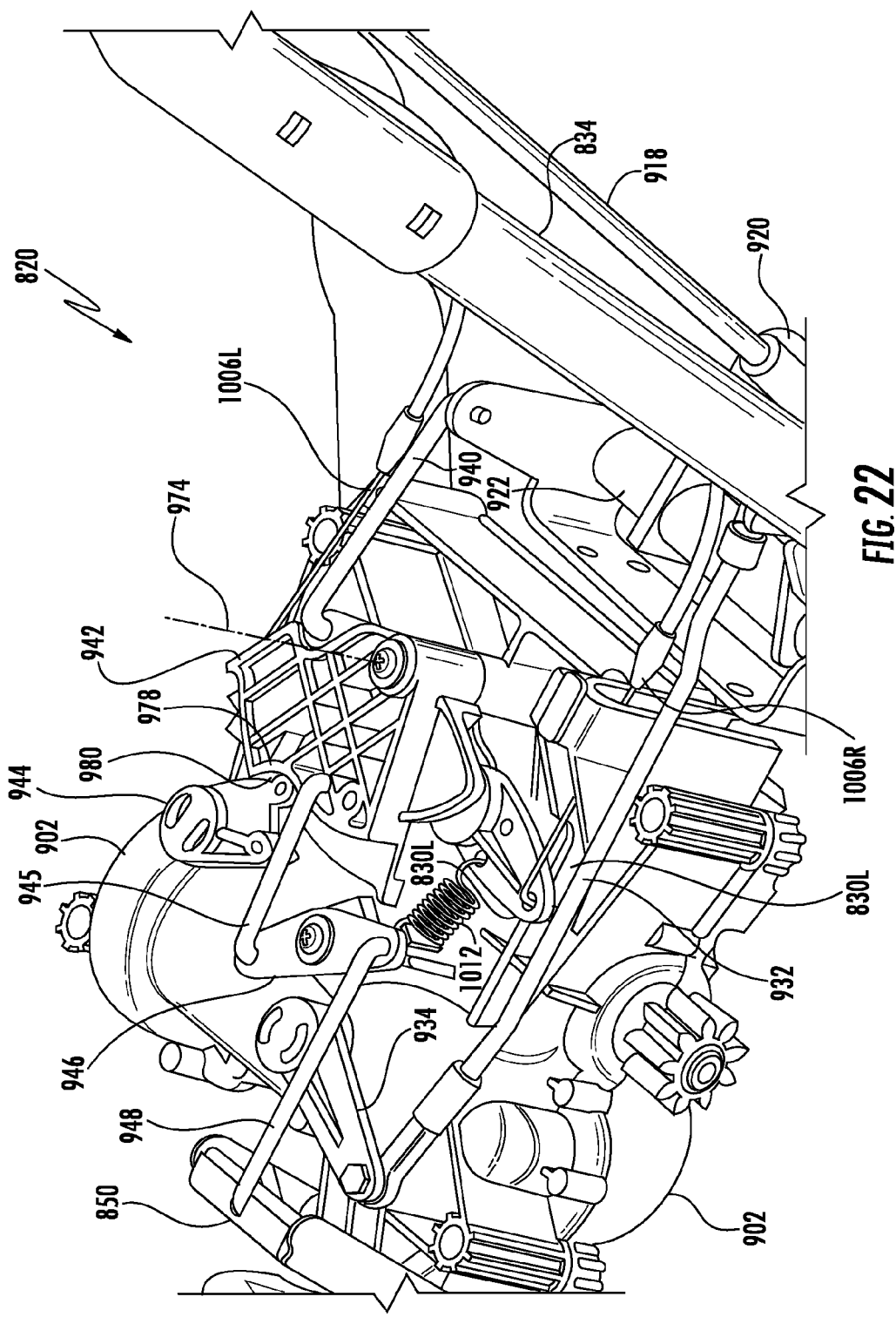
FIG. 22 is another rear perspective view of a portion of the utility implement of FIG. 20.

FIGS. 13, 18 and 22 illustrate steering control portion 908 of control transmission 838 in a neutral state in which both of traction members 826 are engaged to transmission 902 for being rotationally driven in either the forward direction or the reverse direction depending upon the state of portion 906 of control transmission 838. As shown by FIG. 22, traction member disengagement/deactivation levers 830 are resiliently biased by springs 1012 (one of which is shown) to the neutral state in which the associated traction member is engaged to the transmission 902.

Figure 23:
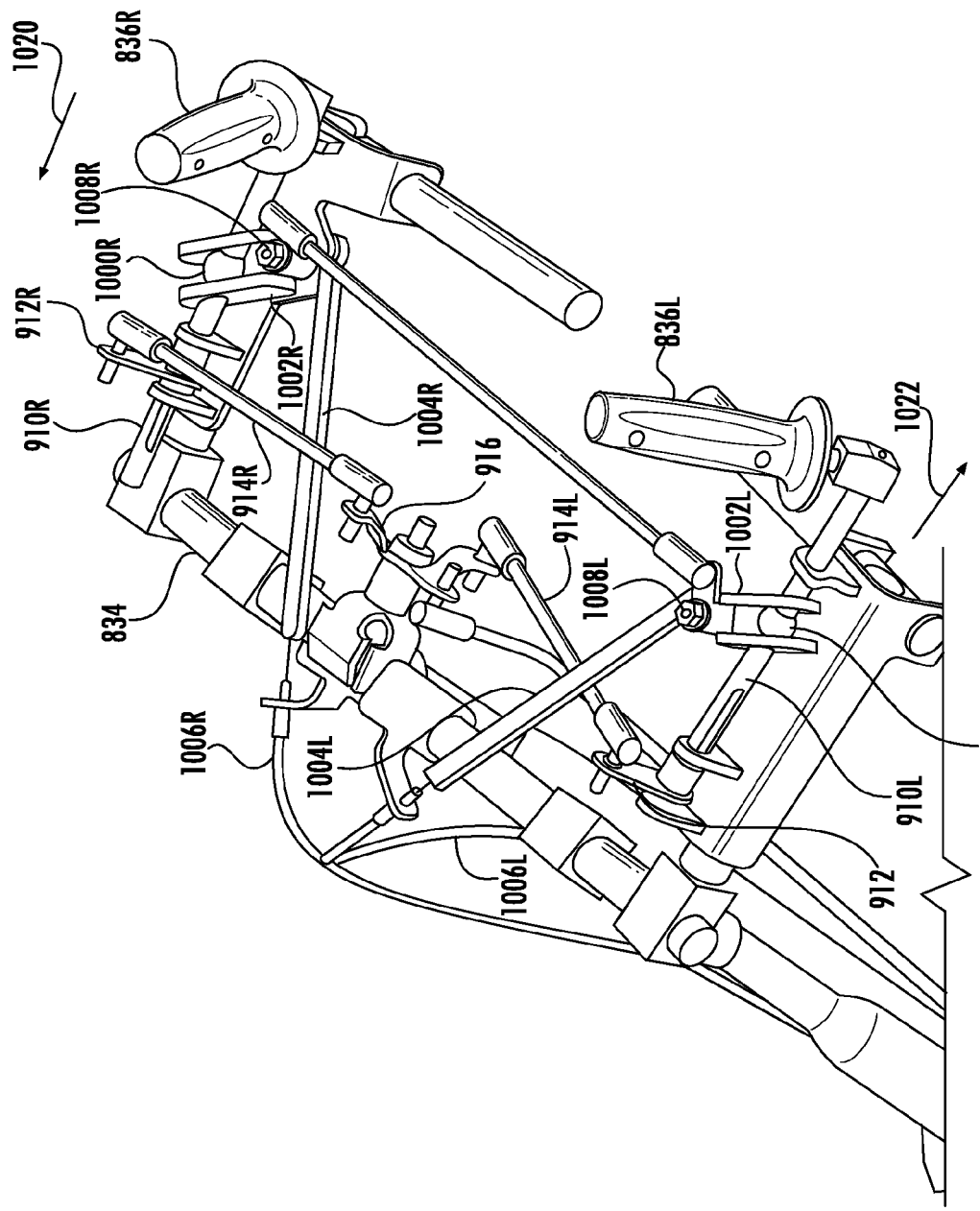
FIG. 23 is a rear perspective view of a portion of the utility implement of FIG. 10 with controls in a fourth position.
Figure 24:
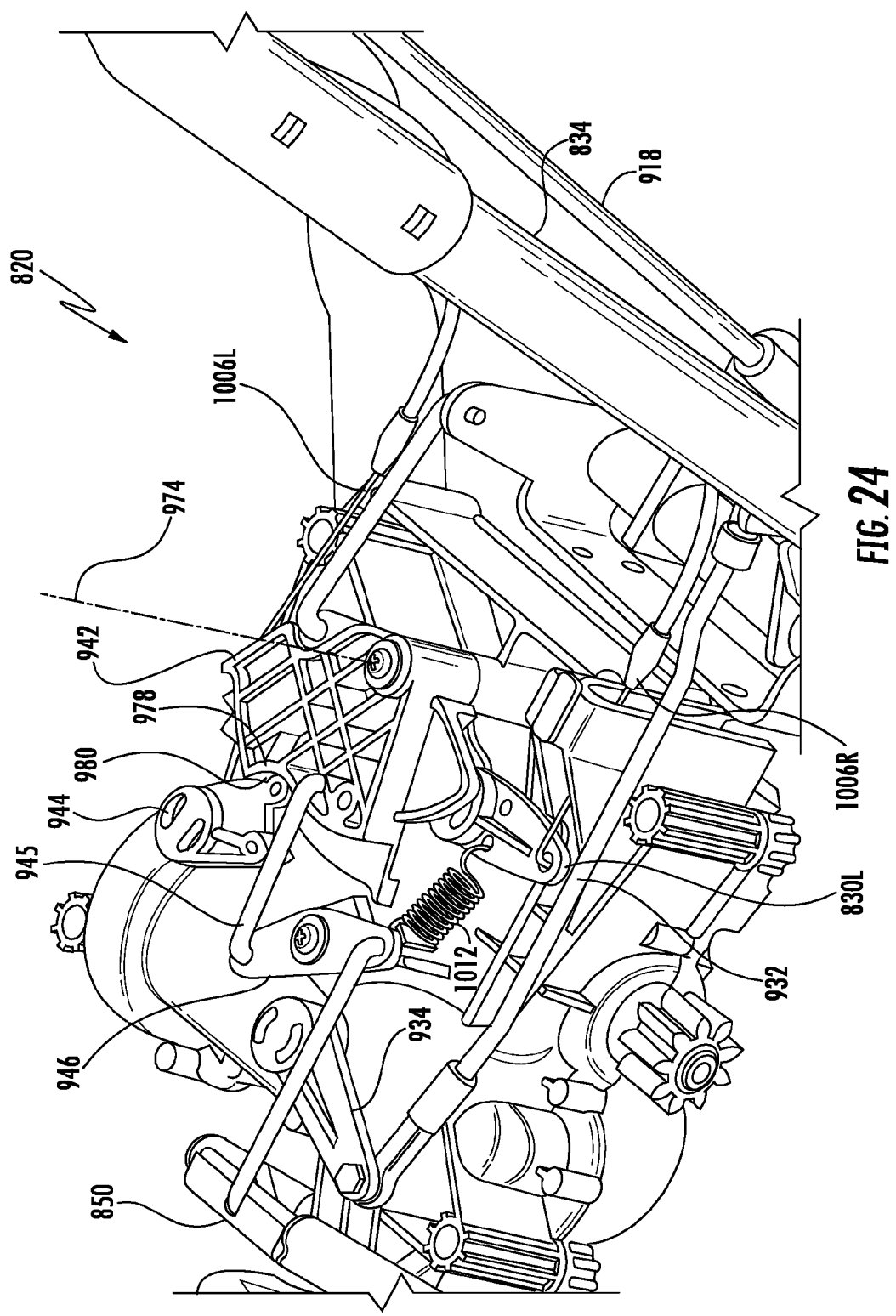
FIG. 24 is a rear perspective view of a portion of the utility implement of FIG. 23.

FIG. 23 illustrates linear movement of control handle 836 in a forward direction (as indicated by arrow 1020) while control handle 836L is linearly moved in a rearward direction as indicated by arrow 1022. During such linear movement, bumpers 1000 interact with forks 1002 to pivot forks 1002 about their axes 1008. In the illustrated scenario, link 1004 is rotated and moved in a rearward direction so as to pull Bowden cable 1006R. As shown by FIG. 24, this results in traction member deactivation/disengagement lever 830L being pulled against the bias a spring 1012 to a deactivation or disengaging state in which the left traction member 826L is disengaged from transmission 902 and is not driven. As a result, continued rotation of the right traction member 826R results in a left turn of snow thrower 820. In other implementations, the relationship between the linear actuation of control handles 836 may be reversed such that forward movement of control handle 836R alternatively results in the right traction member 826R being disengaged or deactivated. Forward linear movement of control handle 836L operates in a similar fashion.

FIGS. 25 and 26 schematically illustrate snow thrower 1120. Snow thrower 1120 comprises frame 1122, traction members 1126 (one of which is shown), front discharger housing 1128 and lifter 1140. Frame 22 (schematically shown) comprises a structure serving as platform, housing and enclosure for snow thrower 1120. Frame 1122 supports the remaining components of snow thrower 1120.

Traction members 1126 comprise members which movably support frame 1122 and the remaining components of snow thrower 1120 above an underlying terrain 1129. Traction members 1126 extend on opposite sides of frame 1122 and have at least one component rotatable or pivotable about axis 1131. In the example illustrated, traction members 1126 comprise wheels rotatably supported about axis 1131. In other implementations, traction members 1126 alternatively comprise tracks, skis or the like pivotally connected to frame 1122 for pivotal movement about axis 1331. In one implementation, traction members 1126 are rotatably driven by propulsion unit, such as propulsion units 28, 828 described above. In yet other implementations, traction members 1126 are not driven.

Front discharger housing 1128 (schematically shown) is part of a snow discharger, such as the snow discharger 24, 824 described above. In one implementation in which snow thrower 1120 comprises a two-stage snow thrower, front discharger housing 1128 comprises an auger housing extending about an auger to guide and direct snow into contact with the auger. In another implementation in which snow thrower 1120 comprises a single stage snow thrower, front discharger housing 1128 comprise a housing about an impeller to guide and direct snow into contact with the impeller which directs the snow through a chute. As shown by FIG. 25, during normal operation, front discharger housing 1128 bears against or rides along an underlying train 1129 in close conformity with the underlying terrain 1129.

Lifter 1140 comprises a mechanism configured to pivot front discharger housing 1128 between a normal operating, lowered position shown in FIG. 25 and a raised position shown in FIG. 26. In the example illustrated, lifter 1140 is configured to pivot front discharge housing 1128 about axis 1131 to raise and lower front discharge housing 1128. In the example illustrated, lifter 1140 comprises at least one ground engager 1142 and at least one actuator 1144.

Ground engager 1142 comprises a member coupled to frame 1122 forward of axis 1131 for movement between a lowered position and a raised position. In the lowered position, ground engager 1142 contacts and engages the underlying terrain 1129 to exert a torque upon housing 1128 for rotation about axis 1131 or to exert an upward lifting force upon housing 1128. In one lowered position, ground engager 1142 engages the ground to pivot a bottom 1148 of housing 1128 above or off of the underlying terrain 1129 as shown in FIG. 26. In another lowered position, ground engager 1142 engages the underlying terrain to exert an upward lifting force upon housing 1128 to counteract the weight of housing 1128, but wherein such force alone is insufficient to raise housing 1128 off of terrain 1129. Because ground engager 1142 counteracts some of the weight of housing 1128, housing 1128 more easily bounces or rises up upon encountering an obstruction.

In the raised position, ground engager 1142 is sufficiently raised so as to not exert a lifting force upon housing 1128. In one implementation, ground engager 1142 slides or rolls along the ground or underlying terrain in the raised position. In another implementation, ground engager 1142 is elevated off of or above the underlying terrain when in the raised position.

In addition to engaging the underlying terrain to provide a lifting force for housing 1128, ground engager 1142 is movable along the underlying train 1129 while lifting housing 1128 and without substantially impeding such forward movement and/or rearward movement of snow thrower 1120. In one implementation, ground engager 1142 comprises one or more wheels or rollers. In one implementation, the wheels or rollers of the ground engager 1142 are idle. In another implementation, ground engager 1142 comprises a sled which slides along the underlying terrain 1129.

Actuator 1144 comprises a mechanism to selectively actuate or move ground engager 1142 between the raised position and the lowered position. In one implementation, actuator 1144 comprises a human powered or manually powered mechanism. For example, in one implementation, actuator 1144 comprises a foot or hand actuated lever. In another implementation, actuator 1144 comprises a powered actuator, an actuator that utilizes non-human generated power to raise and/or lower ground engager 1142.

FIG. 25 illustrates snow thrower 1120 with lifter 1140 in an inactive state in which ground engager 1142 is in the raised position such that housing 1128 is supported along or in close proximity to the underlying terrain. FIG. 26 illustrates lifter 1140 in a lifting state in which ground engager 1142 is lowered so as to pivot housing 1128 in a direction indicated by arrow 1151 about axis 1131. In the example illustrated, actuator 1144 drives ground engaging member 1142 downward with a sufficient force against the underlying train 1129 so as to lift housing 1128. As a result, lifter 1140 lifts housing 1128 so as to reduce or avoid impact or collision of the front edge or front portion of housing 1128 with an obstruction 1153 of the underlying terrain 1129. Such an obstruction 1153 may be in the form of an isolated bump that rises and falls or may be in the form of an abrupt terrain elevation change such as with the ridge or step. For example, a sidewalk may have cracks or elevation changes which present such obstructions 1153. Lifter 1140 facilitates continued movement of snow thrower 1120 about and over such obstructions.

FIGS. 27 and 28 schematically illustrate snow thrower 1220, another example implementation of snow thrower 1120. Snow thrower 1220 is similar to snow thrower 1120 except that snow thrower 1220 is illustrated as specifically comprising powered actuator 1244 in place of actuator 1144 and is illustrated as further comprising propulsion unit 1228, handlebar 1234, sensor 1236, operator input 1238 and controller 1250. Those remaining components of snow thrower 1220 which correspond to components of snow thrower 1120 are numbered similarly.

Powered actuator 1244 comprises an actuator that utilizes non-human generated power to raise and/or lower ground engager 1142. In one implementation, powered actuator 1244 comprises an electric motor. In one implementation, powered actuator 1244 comprises an electric motor coupled to a threaded shaft which is received by an internally threaded receiver that is coupled to ground engager 1142, wherein rotation of the threaded shaft by the electric motor causes the internally threaded receiver to ride up and down along the shaft to raise and lower ground engager 1142. In another implementation, powered actuator 1244 may comprise an electric solenoid, a hydraulic cylinder-piston assembly, a pneumatic cylinder-piston assembly or a cam and cam follower mechanism operably coupled to propulsion unit 1228 or an auger/impeller drive unit by a selectively actuatable transmission. In one implementation, powered actuator 1244 is operably coupled to ground engager 1142 by a four-bar linkage facilitating the maintenance of ground engager 1142 and a level or horizontal orientation as it is being raised and lowered.

Propulsion unit 1228 is similar to propulsion unit 28, 828 described above. Propulsion unit 1228 drives traction members 1126. Propulsion unit 1228 is operably coupled to traction members 1126 by a transmission 1236. In one implementation, propulsion unit 1228 additionally drives an auger and/or impeller within housing 1128. In one implementation, propulsion unit 1228 comprises an internal combustion engine. In another implementation, propulsion unit 1228 comprises an electric motor. In some implementations, propulsion unit 1228 may be omitted, wherein a separate power source drives the auger and/or impeller within housing 1128 and wherein snow thrower 1220 is manually pushed or is pushed or pulled by a separate vehicle.

Handlebar 1234 comprises a curved steering bar or rod extending from frame 22. In the example illustrated, handlebar 1234 projects upwardly and rearwardly from frame 1122, providing a horizontal bar or rod at a height from and between the height of an operator's waist to the height of an operator's shoulders. Handlebar 1234 provides gripping surfaces by which an operator may push, pull or maneuver snow thrower 1220 while snow thrower 1220 is not under power. In one implementation, handlebar 1234 comprises a U-shaped member. In other implementations, handlebar 1234 comprises two opposing L-shaped members. In one implementation, handlebar 1234 supports handgrips 36, 836 and the associated mechanisms described above.

Sensor 1236 comprises one or more sensors that are configured and located so as to detect when a front lower edge or bottom 1148 of housing 1128 has encountered or contacted an obstruction, such as obstruction 1153, or is about to contact such an obstruction. Sensor 1236 produces sensor signals which are transmitted to controller 1250. In one implementation, sensor 1236 comprises an accelerometer which senses the vibration or jarring impact of housing 1128 with an obstruction, such as obstruction 1153. In other implementations, sensor 1236 comprises a camera, an optical emitter-detector, a strain gauge or other types of sensing devices which output signals indicating when a front lower edge or bottom 1148 of housing 1128 has encountered or contacted an obstruction, such as obstruction 1153. In some implementations, sensor 1236 may be omitted.

Operator input 1238 comprises one or more devices configured for contact or manipulation by an operator of snow thrower 1220 so as to produce input signals which are transmitted to controller 1250. Such input signals produced by operator input 1238 are received by controller 1250 and are utilized by controller 1250 to determine if control signal should be output to powered actuator 1244 to adjust the state of lifter 1140 or the position of ground engager 1142. For example, in one implementation, signals from operator input 1238 may override or cancel the pivoting or lifting of housing 1128 otherwise occurring as a result of signals from sensor 1236.

In one implementation, signals from operator input 1238 cause controller 1250 to terminate the pivoting or lifting of housing 1128 and to initiate the lifting of ground engaging member 1142 by powered actuator 1244 to lower housing 1128. In one implementation, operator input 1238 allows an operator to select a height from a plurality of available heights that lifter 1140 lifts the front lower edge of housing 1128 or allows the operator to select one of a plurality of available lifting forces provided by lifter 1140. In yet another implementation, operator input 1238 produces input signals which cause controller 1250 to output control signals to powered actuator 1244, wherein powered actuator 1244 initiates the lowering of ground engaging member 1142 in response to such input signals so as to raise housing 1128.

In one implementation, operator input 1238 is carried by or supported by handlebar 1234. In one implementation in which handlebar 1234 supports handgrips 36, 836, operator input 1238 comprises a switch or button located of on such handgrips 36, 836. In one implementation, operator input 1238 comprises an electrical switch which outputs an electrical input signal in response to depression or other manipulation of operator input 1238. In other implementations, operator input 1238 may be provided at other locations on snow thrower 1220.

Controller 1250 comprises a device to carry out programmed logic so as to output control signals which are transmitted to powered actuator 1244 of lifter 1140 so as to control the state of lifter 1140, the operation of powered actuator 1244 and the positioning of ground engager 1142. In one implementation, controller 1250 comprises an application-specific integrated circuit. In another implementation, controller 1250 comprises one or more processing units to follow instructions, programming or code provided in a non-transitory computer-readable medium or memory.

For purposes of this application, the term "processing unit" shall mean a presently developed or future developed processing unit that executes sequences of instructions contained in a non-transitory computer-readable medium, persistent storage device or memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Unless otherwise specifically noted, the controller is not limited to any specific combination of hardware circuitry and software, nor to any particular source for the instructions executed by the processing unit.

In the example illustrated, controller 1250 receives sensor signals from sensor 1236 indicating when housing 1128 has encountered or is about to encounter an obstruction, such as obstruction 1153 in the underlying terrain 1129. In response to such signals, controller 1250 generates control signals causing powered actuator 1244 to drive or lower ground engager 1142 from the elevated or raised position shown in FIG. 27 to the lowered position shown in FIG. 28. As a result, housing 1128 is pivoted about axis 1131 in the direction indicated by arrow 1151.

In one implementation, controller 1250 includes a clock or timing device, wherein following the lapse of a predetermined amount of time following the lifting of housing 1128, controller 1250 automatically outputs control signals to powered actuator 1244 to initiate the lifting of ground engager 1142 so as to lower housing 1128 to the normal operating position shown in FIG. 27. In another implementation, in response to receipt of input signals from operator input 1238, controller 1250 outputs control signals to powered actuator 1244 interrupting or terminating the lowering of ground engager 1142 and the lifting of housing 1128. In yet another implementation, in response to receipt of input signals from operator input 1238, controller 1250 outputs control signals to powered actuator 1244 causing powered actuator 1244 to begin raising or lifting ground engager 1142 so as to lower housing 1128. In one implementation, in response to receiving input signals from operator input 1238, controller 1250 generates control signals which are transmitted to powered actuator 1244 so as to lower ground engager 1142 to lift housing 1128 in the absence of signals from sensor 1236 or sensor 1236 is omitted.

Figure 29:
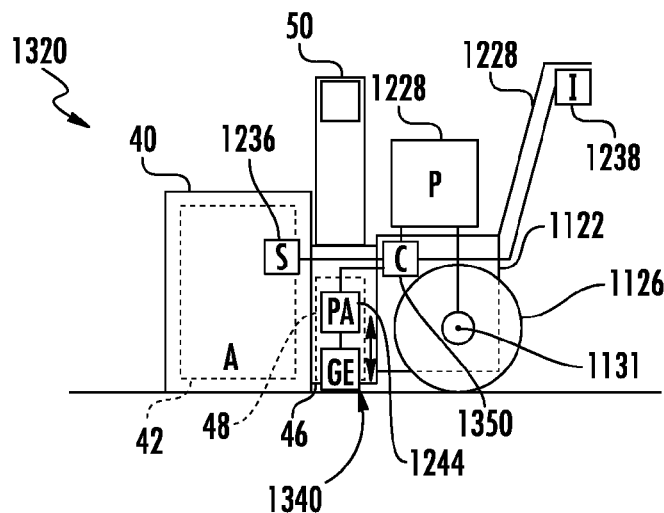
FIG. 29 is a side view schematically illustrating another example utility implement.
Figure 30:
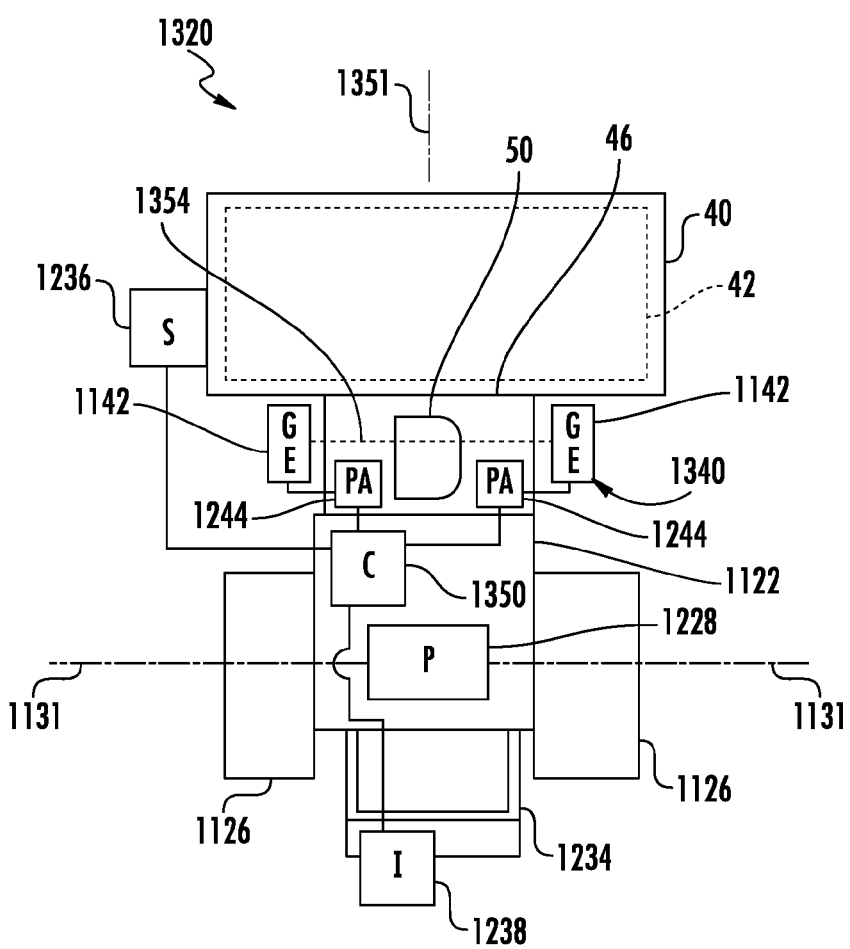
FIG. 30 is a top view of the utility implement of FIG. 29.

FIGS. 29 and 30 schematically illustrate snow thrower 1320, an implementation of snow thrower 1120. FIG. 29 is a side view of snow thrower 1320 while FIG. 30 is a top view of snow thrower 1320. Snow thrower 1320 is similar to snow thrower 1220 except that snow thrower 1320 is specifically illustrated as comprising a two-stage snow thrower. Snow thrower 1320 comprises frame 1122, traction members 1126, propulsion unit 1228, auger housing 40, auger 42, auger drive 44 (shown in FIG. 1), impeller housing 46, impeller 48 and chute 50. Each of frame 1122, traction members 1126, propulsion unit 1228, handlebar 1234, sensor 1236, operator input 1238, auger housing 40, auger 42, auger drive 44 (shown in FIG. 1), impeller housing 46, impeller 48 and chute 50 as described above.

As shown by FIGS. 29 and 30, snow thrower 1320 additionally comprises lifter 1340 and controller 1350. Lifter 1340 is similar to lifter 1140 except that lifter 1340 comprises a pair of ground engagers 1142 and a pair of powered actuators 1244. Ground engagers 1142 are each similar to the ground engager 1142 described with respect to snow thrower 1120. Ground engagers 1142 are movably supported on opposite sides of longitudinal centerline 1351 of snow thrower 1320. In the example illustrated, ground engages 1142 are located alongside impeller housing 46 on opposite sides of impeller housing 46 forward of axis 1131 but behind a rear of auger housing 40. In the example illustrated, ground engagers 1142 are linked or connected to one another by a cross beam or rod 1354 extending below impeller housing 46 such that ground engagers 1142 raise and lower in substantial unison. As a result, the imposition of twisting forces upon impeller housing 46 and auger housing 40 is reduced.

Powered actuators 1244 are each similar to the individual powered actuator 1244 described above with respect to snow thrower 1220. Powered actuators 1244 are each operably coupled to their associated ground engager 1142 on opposite sides of centerline 1351. In one implementation, each of powered actuators 1244 is operably coupled to its associated ground engager 1142 by a four-bar linkage. In other implementations, powered actuators 1244 may be operably coupled to their associated ground engagers 1142 by other linkages or connections. In one implementation, one of powered actuators 1244 may be omitted, wherein the remaining powered actuator 1244 raises both ground engagers 1142.

Controller 1350 comprises a device to carry out programmed logic so as to output control signals which are transmitted to powered actuator 1244 of lifter 1140 so as to control the state of lifter 1140, the operation of powered actuator 1244 and the positioning of ground engager 1142. In one implementation, controller 1250 comprises an application-specific integrated circuit. In another implementation, controller 1350 comprises one or more processing units to follow instructions, programming or code provided in a non-transitory computer-readable medium or memory. In the example illustrated, controller 1350 receives sensor signals from sensor 1236 indicating when housing 40 has encountered or is about to encounter an obstruction, such as obstruction 1153 in the underlying terrain 1129. In response to such signals, controller 1350 generates control signals causing powered actuator 1244 to raise housing 40.

Figure 31:
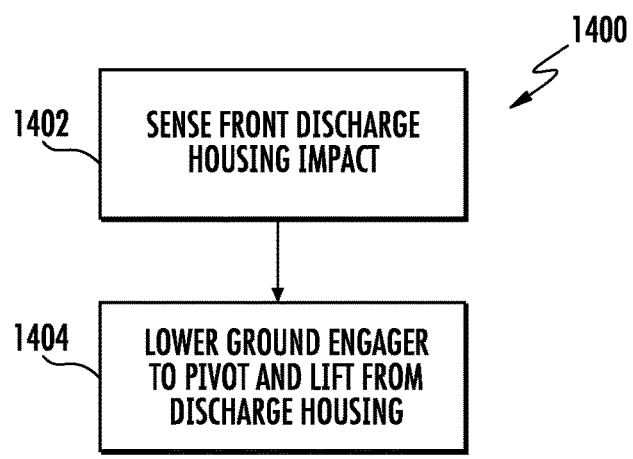
FIG. 31 is a flow diagram of an example method for operating a snow thrower.

FIG. 31 is a flow diagram of an example method 1400 that may be carried out by snow throwers 1220, 1320. As indicated by block 1402, sensor 1236 senses a front discharger housing impact. In one implementation, such sensing is through use of an accelerometer. In other implementations, such sensing is achieved with a camera, an optical emitter-detector, a strain gauge or other types of sensing devices which output signals indicating when a front lower edge or bottom 1148 of housing 1128 has encountered or contacted an obstruction, such as obstruction 1153.

As indicated by block 1404, in response to sensing an impact with front discharge housing 1128 (or auger housing 40), one or more ground engages 1142 are lowered to pivot and lift the front discharge housing 1128 (or auger housing 40). As a result, the front discharge housing/auger housing may be propelled or moved past encountered obstruction.

Figure 32:
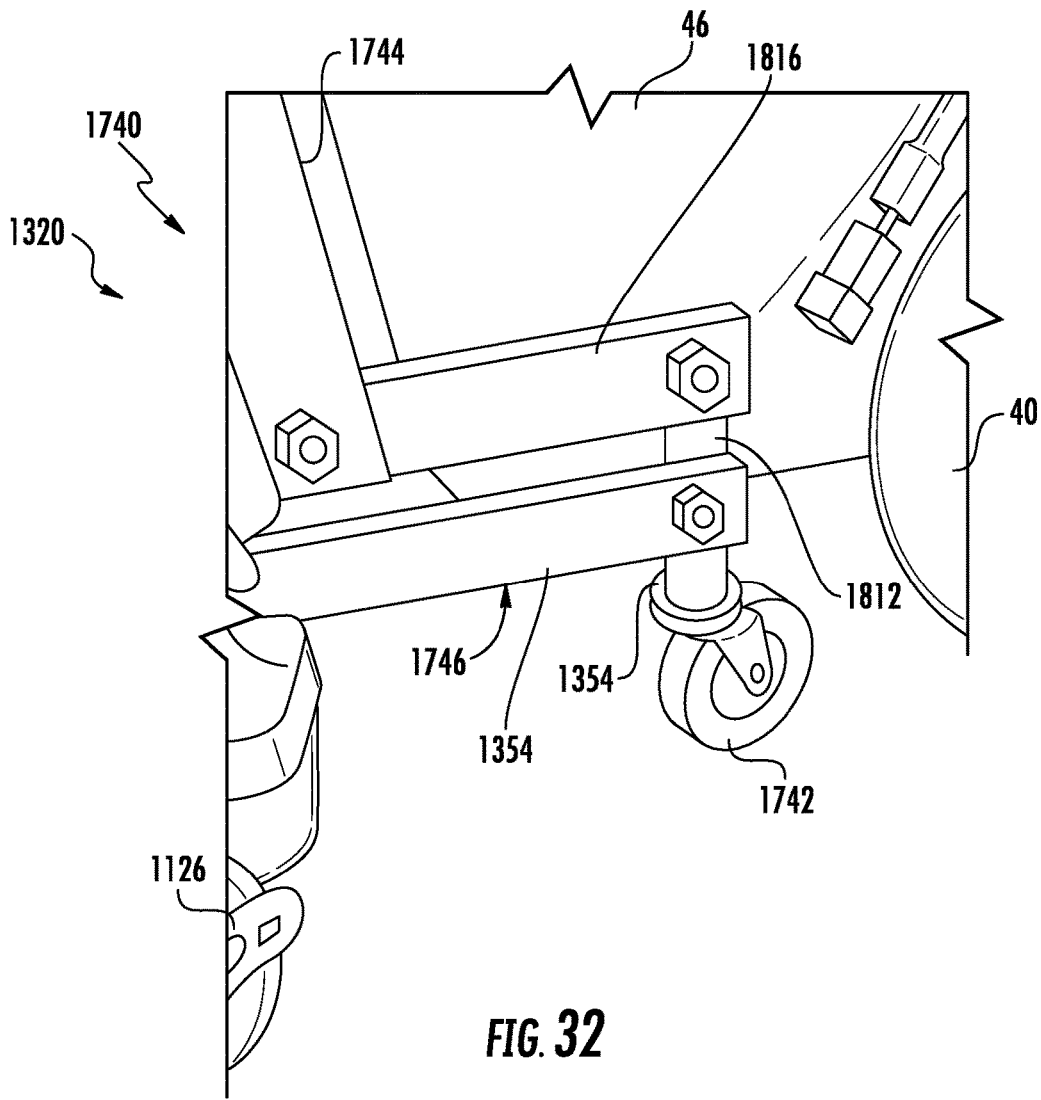
FIG. 32 is an enlarged perspective view of an example lifter of the snow thrower of FIG. 30.
Figure 33:
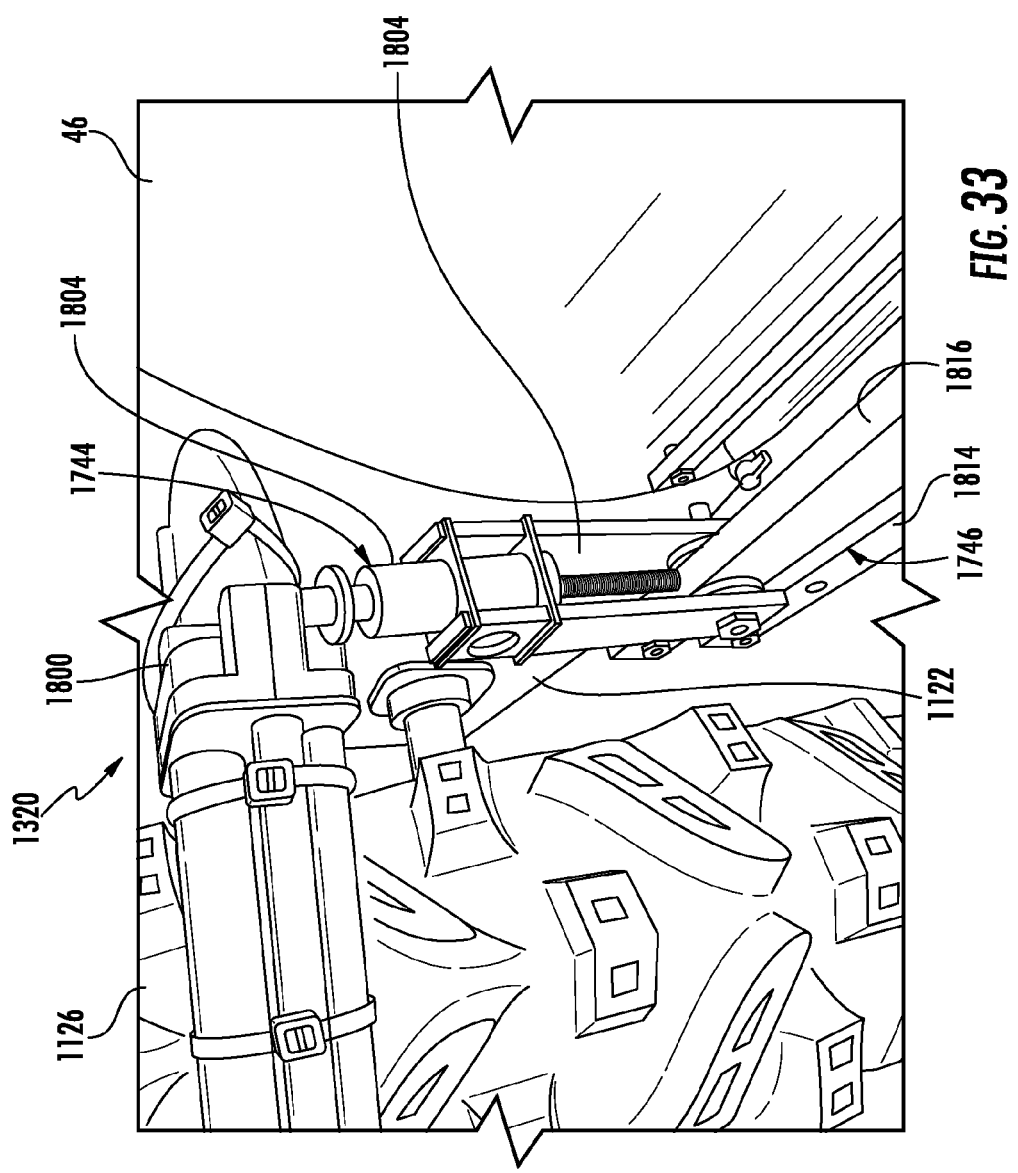
FIG. 33 is a rear perspective view of the example lifter of FIG. 32.

FIGS. 32-35 illustrate a right side of lifter 1740, an example implementation lifter 1340 implemented as part of an example embodiment of snow thrower 1320. The left side of lifter 1740 is similar to the illustrated right side of lifter 1740. Lifter 1740 comprises ground engagers 1742, powered actuators 1744 and couplers or connectors 1746. As shown by FIG. 32, in the example illustrated, ground engagers 1742 comprise castor wheels on opposite sides of impeller housing 46 between auger housing 40 and traction members 1126. In the example illustrated, ground engaging members 1742 are joined to one another by a rod 1354 extending beneath impeller housing 46 such that ground engagers 1742 raise and lower in unison with one another.

As shown by FIG. 35 each of powered actuators 1744 comprises an electric motor 1800 and externally threaded shaft 1802 and antenna internally threaded receiving member 204. Electric motor 1800 is operably coupled to threaded shaft 1802 so as to rotate threaded shaft 1802 in either direction. Externally threaded shaft 1802 threadably engages and passes through internally threaded receiving member 204. Internally threaded receiving member 204 is pivotally connected to connector 1746. In one implementation, internally threaded receiver 1804 comprises a nut which is pivotally connected to connector 1746. Rotation of the externally threaded shaft 1802 by motor 1800 causes receiver 1804 and the connected connector 1746 to move upwardly or downwardly along the axis of shaft 1802 depending upon the direction of rotation.

Figure 34:
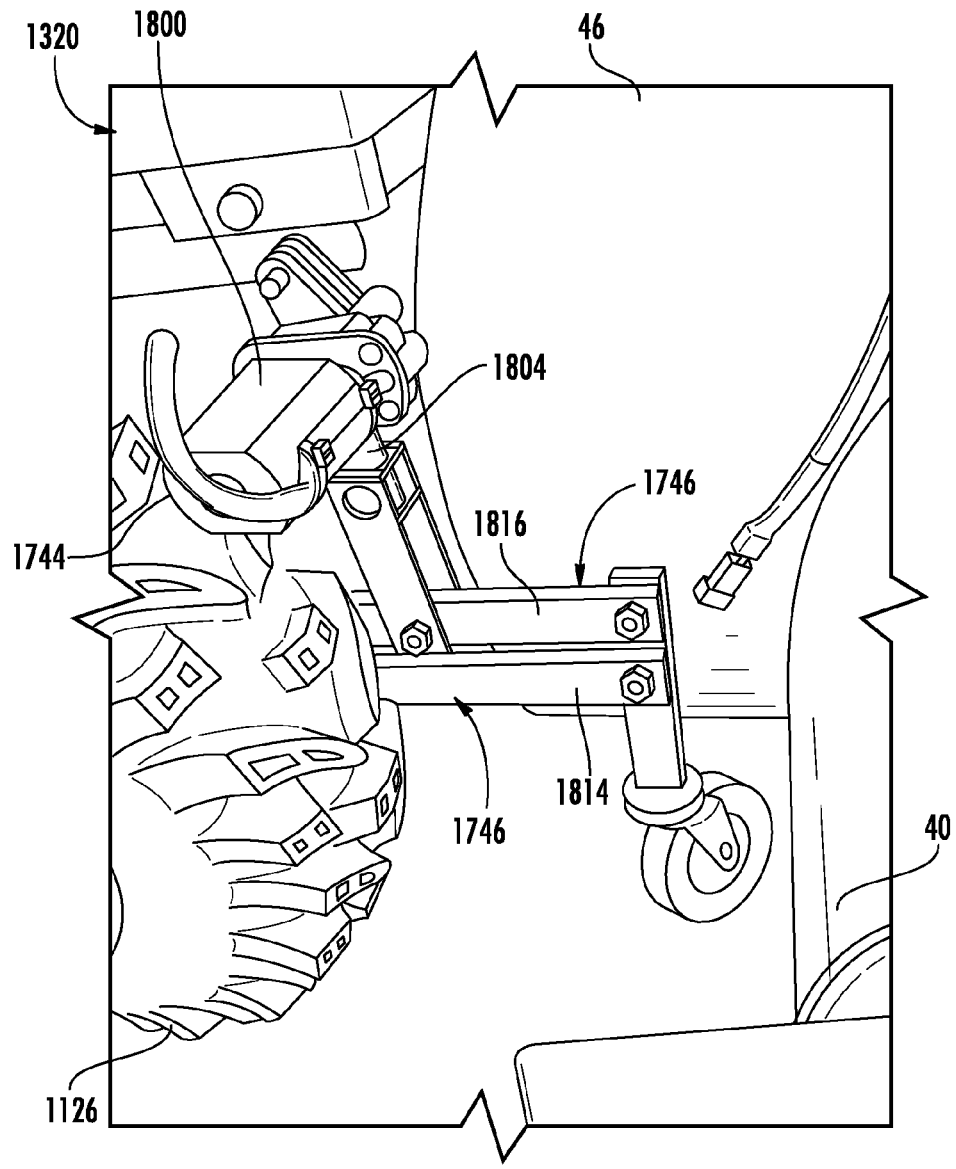
FIG. 34 is a rear perspective view of the example lifter of FIG. 32.

As shown by FIGS. 34, 36 and 37, connector 1746 interconnects powered actuators 1744 and ground engager 1742. In the example illustrated, connector 1746 comprises a four bar linkage comprising a front bar 1812 extending from ground engager 1742, a lower bar 1814 having a first end pivotably connected to front bar 1812 and a second end pivotally connected to frame 1122, and an upper bar 1816 having a front end pivotally connected to front bar 1812 and a rear end pivotally connected to frame 1122. A central portion of upper bar 1816 is pivotally connected to powered actuator 1744, namely the bracket extending from threaded receiver 1804. The four bar linkage of connector 1746 facilitates the retention of ground engager 1742 in a level or horizontal state at all times, regardless of the elevation of such ground engaging members 1742.

In the example illustrated, rotation of shaft 1802 by motor 800 in a first direction lifts the front ends of bars 1814, 1816 to raise the caster wheels serving as ground engagers 1742, allowing auger housing 40 to pivot, under the force of gravity, downward into the default position relative to the underlying terrain, whether the resting upon the underlying train are spaced above the underlying train by another wheel, sled or structure defining operational clearance between the bottom of auger housing 40 and the underlying terrain. Conversely, rotation of shaft 1802 by motor 800 in a second opposite direction lowers the front end of bars 1814, 1816 to lower the castor wheels serving as ground engagers 1742, applying an upward force to auger housing 40 until auger housing 40 is pivoted about the axis of traction members 1126 is a raised state.

The present disclosure contains subject matter described by the following definitions:

1. A utility implement comprising:
   a frame;
   traction members supported by the frame;
   a propulsion unit supported by the frame and operably coupled to the traction members;
   a handle bar coupled to the frame; and
   a control handle extending from the handlebar and located to be gripped by an operator while the operator is maneuvering the utility implement and as the utility implement is being driven by the traction members;
   a control transmission associating the control handle to the propulsion unit such that manipulation of the control handle adjusts operation of the propulsion unit to adjust propulsion of the utility implement by the traction members.
2. The utility implement of definition 1, wherein the control handle comprises a joystick.
3. The utility implement of definition 1, wherein the control handle is actuatable to switch between a forward direction and a rearward direction.
4. The utility implement of definition 1, wherein the traction members comprises left traction member and a right traction member and wherein the control handle is actuatable to differently drive the left traction member and the right traction member relative to one another.
5. The utility implement of definition 1, wherein the control handle is actuatable to adjust the transmission to control a speed in which the traction members move the utility implement.
6. The utility implement of definition 1, wherein control handle is pivotable about an axis to control the direction.
7. The utility implement of definition 6, wherein the axis is a fore-aft extending axis.
8. The utility implement of definition 7, wherein the control handle is linearly movable in the fore-aft direction.
9. The utility implement of definition 1, wherein the control handle is actuatable to control a direction at which the traction members move the utility implement, to control the speed at which the traction members move the utility implement and to differently drive a left traction member of the traction members relative to a right traction member of the traction members.
10. The utility implement of definition 9, wherein the control handle is pivotable about a fore-aft axis from a neutral position, the first rotational direction from the neutral position corresponding to a forward direction and a second rotational direction from the neutral position corresponding to a reverse direction and an angular extent of rotation from the neutral position corresponding to a speed.
11. The utility implement of definition 10, wherein the control handle is inclined below vertical towards a centerline of the utility implement when the control handle is in the neutral position.
12. The utility implement of definition 10, wherein the control handle it resiliently biased to the neutral position.
13. The utility implement of definition 10, wherein the control handle is linearly movable along the fore-aft axis, different linear positions of the control handle corresponding to different propulsion of a left traction member and a traction member of the traction members relative to one another.
14. The utility implement of definition 1 further comprising a second control handle extending from the handlebar and located to be gripped while an operator is maneuvering the utility implement, the control handle located to be gripped by a right-hand of the operator while the second control handle is being gripped by a left-hand of the operator during maneuvering of the utility implement and as the utility implement is being driven by the traction members.
15. The utility implement of definition 14, wherein the second control handle comprises a second joystick.
16. The utility implement of definition 14, wherein the second control handle is actuatable to switch propulsion of the utility implement between a forward direction and a rearward direction.
17. The utility implement of definition 14, wherein the second control handle is actuatable to differently drive a left traction member of the traction members and a right traction member of the traction members relative to one another.
18. The utility implement of definition 14, wherein the second control handle is actuatable to adjust the transmission to control a speed in which the traction members move the utility implement.
19. The utility implement of definition 14, wherein second control handle is pivotable about a second axis to control the direction.
20. The utility implement of definition 19, wherein the second axis is a second fore-aft extending axis.
21. The utility implement of definition 20, wherein the second control handle is linearly movable in the fore-aft direction.
22. The utility implement of definition 14, wherein the second control handle is actuatable to control a direction at which the traction members move the utility implement, to control the speed at which the traction members move the throw utility implement and to differently drive the left traction member of the traction members relative to the right traction member of the traction members.
23. The utility implement of definition 22, wherein the second control handle is pivotable about a fore-aft axis from a neutral position, the first rotational direction from the neutral position corresponding to a forward direction and a second rotational direction from the neutral position corresponding to a reverse direction and an angular extent of rotation from the neutral position corresponding to a speed.
24. The utility implement of definition 23, wherein the second control handle is inclined below vertical towards a centerline of the utility implement when the second control handle is in the neutral position.
25. The utility implement of definition 23, wherein the second control handle it resiliently biased to the neutral position.
26. The utility implement of definition 23, wherein the second control handle is linearly movable along the fore-aft axis, different linear positions of the control handle corresponding to different propulsion of a left traction member and a traction member of the traction members relative to one another.
27. The utility implement of definition 14, wherein the control handle and the second control handle are linked to one another such that movement of one of the control handle and the second control handle automatically results in proportional movement of the other of the control handle and the second control handle.
28. The utility implement of definition 27, wherein the control handle and the second control handle are pivotally supported for pivotal movement about a first fore-aft axis and a second fore-aft axis, respectively, and wherein the control handle and the second control handle are linked such that pivotal movement of one of the control handle and the second control handle in a clockwise direction automatically results in pivotal movement of the other of the control handle in the second control handle in a counterclockwise direction.
29. The snow thrower of definition 28, wherein the control handle and the second control handle are movably supported for linear forward/rearward movement and wherein the control handle and the second control handle are linked such that linear forward movement of one of the control handle and the second control handle automatically results in linear rearward of the other of the control handle in the second control.
30. The snow thrower of definition 29, wherein the control handle and the second control handle are movably supported for linear forward/rearward movement and wherein the control handle and the second control handle are linked such that linear forward movement of one of the control handle and the second control handle automatically results in linear rearward of the other of the control handle in the second control.
31. The snow thrower of definition 14, wherein the traction members comprise a left traction member and a right traction member, the control transmission comprising:
 a first position sensor operably coupled to the control handle to output first signals in response to actuation of the control handle; and
 a second position sensor operably coupled to the second control handle to output second signals in response to actuation of the second control handle, the propulsion unit comprising:
 a left motor operably coupled to the left traction member; and
 a right motor operably coupled to the right traction member; and
 at least one controller in communication with the first position sensor and the second position sensor, the at least one controller generating control signals to independently drive the left traction member and the right traction member in response to the first signals and the second signals.
32. The snow thrower of definition 14, wherein the traction members comprise a left traction member any right traction member, the control transmission comprising:
 a first hydraulic control valve operably coupled to the control handle; and
 a second hydraulic control valve operably coupled to the second control handle, wherein the propulsion unit comprises:
 a left hydraulic motor operably coupled to the left traction member;
 a right hydraulic motor operably coupled to the right traction member, wherein the first hydraulic control valve and the second hydraulic control valve are configured to direct hydraulic fluid drive to drive the left hydraulic motor and the right hydraulic motor to independently drive the left traction member and the right traction member in response to actuation of the control handle and the second control handle.
33. The snow thrower of definition 14, wherein the control handle and the second control handle are rotatably supported for rotation towards one another and away from one another and wherein the control transmission comprises:
 a rotational position sensor operably coupled to at least one of the control handle and the second control handle to sense the rotational position of at least one of the control handle and the second control handle; and
 an actuator to adjust the propulsion unit, based upon a sensed rotational position of at least one of the control handle in the second control panel, between a forward state in which the following unit drives the snow thrower in a forward direction and a rearward state in which the propulsion unit drives snow thrower in a rearward direction.
34. The snow thrower of definition 14, wherein the control handle is actuatable to adjust the propulsion unit between a forward state in which the following unit drives the snow thrower in a forward direction and a rearward state in which the propulsion unit drives snow thrower in a rearward direction and wherein the second control handle is actuatable to adjust driving of a left traction member of the traction members relative to a right traction member of the traction members.
35. The snow thrower of definition 14, wherein propulsion unit comprises:
 an engine; and
 a transmission operably coupling the engine to traction members.
36. The snow thrower of definition 35 further comprising:
 a left traction member deactivation lever operably coupled to the transmission to selectively engage and disengage the left traction member respect to the transmission;
 a right traction member deactivation lever operably coupled to the transmission to selectively engage and disengage the right traction member with respect to the transmission;
 a transmission actuation lever to selectively engage and disengage the transmission with respect to the engine;
 a transmission speed control lever to selectively adjust a speed of the transmission; and
 a directional control lever to switch the transmission between a forward driving state a rearward driving state,
 wherein the control handle and the second control handle are linearly movable in forward and rearward directions and are operably coupled to the left traction member deactivation lever and the right traction member deactivation lever to actuate the left traction member deactivation lever and the right traction member activation lever in response to linear movement of control handle and the second control handle in the forward and rearward directions,
 wherein the control handle and the second control handle are rotatable about fore-aft axes and are operably coupled to the transmission actuation lever and the directional control lever such that rotation of the control handle and the second control handle in a first rotation direction switches the transmission from the forward driving state to the rearward driving state and rotation of the control handle and the second control handle in a second rotational direction switches the transmission from the rearward driving state to the forward driving state, and wherein the control handle and the second control handle are operably coupled to the transmission speed control lever such that adjusting angular extent of rotation of the first control handle and the second control handle move the transmission speed control lever to adjust a speed of the transmission.

37. The snow thrower of definition 1 further comprising:
a snow removal auger; and
a manual input carried by the control handle, actuation of the manual input adjusting operation of the auger.

38. The snow thrower of definition 1 further comprising:
a snow thrower chute rotatably supported relative to the frame; and
a manual input carried by the control handle, actuation of the manual input adjusting a rotational position of the chute.

39. A snow thrower comprising:
traction members;
an auger,
a rotatable chute to direct snow;
a propulsion unit to drive the traction members;
a handlebar; and
first and second control handles extending from the handlebar and located to be continuously gripped by left and right hands of an operator as snow thrower is being driven by the traction members, the first and second control handles being actuatable to adjust at least one operational parameter selected from a group of operational parameters consisting of: auger speed; auger on/off state; chute rotation; forward/rearward movement of the snow thrower; speed at which the snow thrower is driven by the traction members; and left/right driving of the traction members.

40. A method comprising:
providing first and second control handles extending from a handlebar and located to be continuously gripped by left and right hands of an operator as utility implement is being driven by traction members; and
adjusting at least one operational parameter of the utility implement in response to repositioning of the first and second control handles while the first and second control handles are being continuously gripped by the left and right hands of the operator.

41. A snow thrower comprising:
a frame;
wheels rotatably coupled to the frame for rotation about an axis;
front discharge housing supported by the frame forward the wheels;
a lifter comprising:
a ground engager movably coupled to the frame forward the axis; and
an actuator operably coupled to the ground engager to selectively lower the ground engager into engagement with an underlying terrain to pivot the front discharge housing about the axis.

42. The snow thrower of definition 41, wherein the actuator comprises a powered actuator.

43. The snow thrower of definition 42, wherein the powered actuator comprises an electric motor operably coupled to the lifter.

44. The snow thrower a definition 43, wherein the powered actuator further comprises:
a threaded shaft coupled to the electric motor to be rotatably driven by the electric motor; and
a threaded receiver about the threaded shaft coupled to the lifter such that rotation of the threaded shaft raises and lowers the lifter.

45. The snow thrower of definition 44 further comprising a four bar linkage supporting the lifter and coupled to the threaded receiver.

46. The snow thrower of definition 42 further comprising a four bar linkage supporting the lifter.

47. The snow thrower of definition 42 further comprising:
a powered actuator supported by the frame; and
a four bar linkage supporting the lifter and operably coupled to the powered actuator.

48. The snow thrower of definition 1, wherein the ground engager comprises a wheel.

49. The snow thrower definition one further comprising an impeller housing, wherein the ground engager is alongside the impeller housing behind the front discharge housing.

50. The snow thrower of definition 1 further comprising a second ground engager, wherein the ground engager is on a first side of a centerline of the snow thrower and wherein the second ground engager is on a second side of the centerline.

51. The snow thrower of definition 50, wherein the ground engager and the second ground engager are coupled to one another to raise and lower in unison with one another.

52. The snow thrower of definition 50 further comprising a second powered actuator operably coupled to the second ground engager to raise and lower the second ground engager with respect to the underlying terrain.

53. The snow thrower of definition 50 further comprising:
a first powered actuator supported by the frame;
the first four bar linkage operably coupling the ground engager to the first powered actuator;
a second powered actuator supported by the frame; and
a second four bar linkage operably coupling the second ground engager to the second powered actuator.

54. The snow thrower of definition 41 further comprising:
a powered actuator operably coupled to the lifter to raise and lower the ground engager with respect to the underlying terrain;
a sensor to detect an impact of the auger housing; and
a controller to receive sensor signals from the sensor indicating the impact of the auger housing, the controller automatically generating control signals in response to the sensor signals, the control signals causing the powered actuator to automatically lower the ground engager to pivot the front discharge housing upwardly about the axis.

55. The snow thrower of definition 54, wherein the sensor comprises an accelerometer.

56. The snow thrower of definition 54 further comprising a user input, wherein actuation of the user input produces input signals, wherein the controller is to automatically generate second control signals in response to the input signals, the second control signals causing the powered actuator to automatically raise or lower the ground engager to pivot the front discharge housing downwardly about the axis.

57. The snow thrower of definition 54 further comprising a propulsion unit, wherein the controller is to output control signals adjusting forward and rearward movement of the snow thrower by the propulsion unit based at least in part upon the sensor signals.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A utility implement comprising:
a frame;
traction members supported by the frame;
a propulsion unit supported by the frame and operably coupled to the traction members;
a handle bar coupled to the frame, the handlebar providing gripping surfaces by which an operator may push, pull or maneuver the utility implement over a terrain while the utility implement is not under power, wherein the handlebar is cantilevered rearwardly beyond the traction members and rearwardly beyond a rear end of the frame;
a control handle extending from the handlebar and located to be gripped by an operator while the operator is maneuvering the utility implement and as the utility implement is being driven by the traction members;
a control transmission associating the control handle to the propulsion unit such that manipulation of the control handle adjusts operation of the propulsion unit to adjust propulsion of the utility implement by the traction members
a second control handle extending from the handlebar and located to be gripped while an operator is maneuvering the utility implement, the control handle located to be gripped by a right-hand of the operator while the second control handle is being gripped by a left-hand of the operator during maneuvering of the utility implement and as the utility implement is being driven by the traction members, wherein the control handle and the second control handle are linked to one another such that movement of one of the control handle and the second control handle automatically results in proportional movement of the other of the control handle and the second control handle, wherein the control handle and the second control handle are pivotally supported for pivotal movement about a first fore-aft axis and a second fore-aft axis, respectively, and wherein the control handle and the second control handle are linked such that pivotal movement of one of the control handle and the second control handle in a clockwise direction automatically results in pivotal movement of the other of the control handle and the second control handle in a counterclockwise direction.

2. The utility implement of claim 1, wherein the control handle comprises a joystick.

3. The utility implement of claim 1, wherein the control handle is actuatable to switch between a forward direction and a rearward direction.

4. The utility implement of claim 1, wherein the traction members comprises left traction member and a right traction member and wherein the control handle is actuatable to differently drive the left traction member and the right traction member relative to one another.

5. The utility implement of claim 1, wherein the control handle is actuatable to adjust the transmission to control a speed in which the traction members move the utility implement.

6. The utility implement of claim 1, wherein control handle is pivotable about an axis to control the direction.

7. The utility implement of claim 6, wherein the axis is a fore-aft extending axis.

8. The utility implement of claim 7, wherein the control handle is linearly movable in the fore-aft direction.

9. The utility implement of claim 1, wherein the control handle is actuatable to control a direction at which the traction members move the utility implement, to control the speed at which the traction members move the utility implement and to differently drive a left traction member of the traction members relative to a right traction member of the traction members.

10. The utility implement of claim 9, wherein the control handle is pivotable about a fore-aft axis from a neutral position, the first rotational direction from the neutral position corresponding to a forward direction and a second rotational direction from the neutral position corresponding to a reverse direction and an angular extent of rotation from the neutral position corresponding to a speed.

11. The utility implement of claim 10, wherein the control handle is inclined below vertical towards a centerline of the utility implement when the control handle is in the neutral position.

12. The utility implement of claim 10, wherein the control handle it resiliently biased to the neutral position.

13. The utility implement of claim 10, wherein the control handle is linearly movable along the fore-aft axis, different linear positions of the control handle corresponding to different propulsion of a left traction member and a traction member of the traction members relative to one another.

14. The utility implement of claim 1, wherein the control handle and the second control handle are rotatably supported for rotation towards one another and away from one another and wherein the control transmission comprises:
a rotational position sensor operably coupled to at least one of the control handle and the second control handle to sense the rotational position of at least one of the control handle and the second control handle; and
an actuator to adjust the propulsion unit, based upon a sensed rotational position of at least one of the control handle and the second control handle, between a forward state in which the propulsion unit drives the utility implement in a forward direction and a rearward state in which the propulsion unit drives the utility implement in a rearward direction.

15. The utility implement of claim 1, wherein the control handle is actuatable to adjust the propulsion unit between a forward state in which the propulsion unit drives the snow thrower in a forward direction and a rearward state in which the propulsion unit drives the utility implement in a rearward direction and wherein the second control handle is actuatable to adjust driving of a left traction member of the traction members relative to a right traction member of the traction members.

16. The utility implement of claim 1 further comprising:
a snow removal auger;
a snow thrower chute rotatably supported relative to the frame; and
a manual input carried by the control handle, actuation of the manual input adjusting one of a rotational position of the chute and operation of the auger.

\* \* \* \* \*